(12) United States Patent
Belias et al.

(10) Patent No.: US 11,873,149 B2
(45) Date of Patent: Jan. 16, 2024

(54) BLOWN FILM MATERIALS AND PROCESSES FOR MANUFACTURING THEREOF AND USES THEREOF

(71) Applicant: SoFresh, Inc., Pleasant Prairie, WI (US)

(72) Inventors: William P. Belias, Pittsford, NY (US); Toby R. Thomas, Pleasant Prairie, WI (US)

(73) Assignee: SoFresh, Inc., Pleasant Prairie, WI (US)

( * ) Notice: Subject to any disclaimer, the term of this patent is extended or adjusted under 35 U.S.C. 154(b) by 212 days.

(21) Appl. No.: 17/291,983

(22) PCT Filed: Nov. 6, 2019

(86) PCT No.: PCT/US2019/060135
§ 371 (c)(1),
(2) Date: May 6, 2021

(87) PCT Pub. No.: WO2020/097247
PCT Pub. Date: May 14, 2020

(65) Prior Publication Data
US 2021/0292066 A1    Sep. 23, 2021

Related U.S. Application Data

(60) Provisional application No. 62/758,012, filed on Nov. 9, 2018.

(51) Int. Cl.
*B65D 65/42* (2006.01)
*B29C 48/00* (2019.01)
(Continued)

(52) U.S. Cl.
CPC .......... *B65D 65/42* (2013.01); *B29C 48/0017* (2019.02); *B29C 48/0021* (2019.02);
(Continued)

(58) Field of Classification Search
None
See application file for complete search history.

(56) References Cited

U.S. PATENT DOCUMENTS 4,909,726 A * 3/1990 Bekele .................. B32B 7/12
                                                     428/34.3
5,382,391 A    1/1995 Juhl et al.
(Continued)

FOREIGN PATENT DOCUMENTS

CN        1966361 A      5/2007
CN      103459148 A     12/2013
(Continued)

OTHER PUBLICATIONS

Ampacet Corporation, (2018). "Slip Masterbatch," Ampacet Corporation, available online at <https://www.ampacet.com/faqs/slips/>, Obtained on Sep. 23, 2018, 3 pages.
(Continued)

*Primary Examiner* — Ramsey Zacharia
(74) *Attorney, Agent, or Firm* — MORRISON & FOERSTER LLP

(57) ABSTRACT

Provided herein are blown films with encapsulated active agents, such as volatile anti-microbial agents, suitable for use as food packaging materials. Also provided herein are methods of manufacturing such blown films. The methods include extruding a bubble from molten polymers, dispensing active agents inside the bubble, and collapsing the bubble such that the bubble self-adheres to form a film with the active agents encapsulated.

32 Claims, 20 Drawing Sheets

(51) Int. Cl.
| | |
|---|---|
| *B29C 48/09* | (2019.01) |
| *B29C 48/22* | (2019.01) |
| *B65D 81/28* | (2006.01) |
| *B32B 7/12* | (2006.01) |
| *B32B 27/08* | (2006.01) |
| *B32B 27/30* | (2006.01) |
| *B32B 27/32* | (2006.01) |
| *B29L 23/00* | (2006.01) |

(52) U.S. Cl.
CPC .......... *B29C 48/0022* (2019.02); *B29C 48/09* (2019.02); *B29C 48/22* (2019.02); *B65D 81/28* (2013.01); *B29C 2793/009* (2013.01); *B29C 2793/0045* (2013.01); *B29L 2023/001* (2013.01); *B32B 7/12* (2013.01); *B32B 27/08* (2013.01); *B32B 27/304* (2013.01); *B32B 27/306* (2013.01); *B32B 27/32* (2013.01); *B32B 2553/00* (2013.01)

(56) References Cited

U.S. PATENT DOCUMENTS

| | | | |
|---|---|---|---|
| 6,030,123 | A | 2/2000 | Mitarai |
| 6,050,990 | A | 4/2000 | Tankovich et al. |
| 6,316,067 | B1 | 11/2001 | Edwards et al. |
| 6,511,723 | B1 | 1/2003 | Engelaere |
| 6,620,474 | B1 | 9/2003 | Regnier et al. |
| 7,687,123 | B2 | 3/2010 | Broadus et al. |
| 7,968,388 | B2 | 6/2011 | Komatsu |
| 8,415,208 | B2 | 4/2013 | Takayama et al. |
| 8,852,749 | B2 | 10/2014 | Chen |
| 8,939,181 | B2 | 1/2015 | Kanenari et al. |
| 10,351,680 | B2 | 7/2019 | Yonekawa et al. |
| 2004/0212113 | A1 | 10/2004 | Hasing et al. |
| 2005/0143817 | A1 | 6/2005 | Hunter et al. |
| 2006/0188558 | A1 | 8/2006 | Jackson et al. |
| 2007/0098900 | A1 | 5/2007 | Abe et al. |
| 2008/0220036 | A1* | 9/2008 | Miltz ............... C08K 5/0058 424/409 |
| 2008/0226698 | A1 | 9/2008 | Tang et al. |
| 2009/0067760 | A1 | 3/2009 | Shelley et al. |
| 2009/0220739 | A1 | 9/2009 | Chougule |
| 2012/0273084 | A1 | 11/2012 | Belias et al. |
| 2012/0288693 | A1 | 11/2012 | Stanley et al. |
| 2013/0029553 | A1 | 1/2013 | Trouilhet et al. |
| 2013/0181381 | A1 | 7/2013 | Dujardin et al. |
| 2014/0029873 | A1 | 1/2014 | Cruz et al. |
| 2014/0205847 | A1 | 7/2014 | Falla |
| 2017/0266860 | A1 | 9/2017 | Wood et al. |
| 2018/0303042 | A1* | 10/2018 | Daios ............... A01G 9/1438 |
| 2019/0045804 | A1 | 2/2019 | Vries et al. |
| 2019/0054721 | A1 | 2/2019 | Planeta et al. |

FOREIGN PATENT DOCUMENTS

| | | |
|---|---|---|
| CN | 101842232 A | 1/2014 |
| CN | 104169386 A | 11/2014 |
| CN | 105593013 A | 5/2016 |
| CN | 106062988 A | 10/2016 |
| CN | 106132695 A | 11/2016 |
| EP | 0955642 A2 | 11/1999 |
| EP | 1699633 | 9/2006 |
| IN | 285344 B | 7/2017 |
| JP | S48-097937 A | 12/1973 |
| JP | 2000109754 A | 4/2000 |
| WO | WO-2005068194 A1 | 7/2005 |
| WO | WO-2017175225 A1 | 10/2017 |
| WO | WO-2020097247 A1 | 5/2020 |
| WO | WO-2021207319 A1 | 10/2021 |
| WO | WO-2022109572 A1 | 5/2022 |

OTHER PUBLICATIONS

Colortech Inc., "Selecting Amide Slip Concentrates for Polyethylene Film Applications," Available online at <https://www.colortech.com/products-and-services/technical-bulletins/303-selecting-amide-slip-concentrates-for-polyethylene-film-applications%E2%80%A6>, Obtained on Sep. 23, 2018, 4 pages.

Durark et al., (2012). "Decontamination of Green Onions and Baby Spinach by Vaporized Ethyl Pyruvate," Journal of Food Protection, 75(6):1012-1022.

Leonard, (2012). "SunChemical: Gas Barrier Coatings For Flexible Packaging," AIMCAL Europe Web Coating Conference, 36 pages.

Lucera et al., (2015). "Ch 25: Volatile Compounds Usage in Active Packaging Systems," Antimicrobial Food Packaging 1st Edition, 9 pages.

Najarzadeh, (2014). "Thesis: Control and Optimization of Sealing Layer in Films," Universite de Montreal, Department de Genie Chimique Ecole Polytechnique de Montreal, 165 pages.

Nguyen et al., (2015). "Ch 4: Fungal Contamination in Package Foods," Antimicrobial Food Packaging 1st Edition, 19 pages.

Perez-Perez et al., (2006). "Chapter 9: Incorporation of antimicrobial agents in the food packaging films and coatings," Advances in Agricultural and Food Biotechnology, pp. 193-216.

Sigma-Aldrich, (2014). "Safety Data Sheet: 'Ethyl pyruvate' Product No. W245712," Sigma-Aldrich version 4.9, Obtained on Apr. 18, 2017, 7 pages.

Sung et al., (2013). "Antimicrobial agents for food packaging applications," Trends in Food Science & Technology, 33(2):110-123.

Toews, (2006). "Pyruvate," Delicious Living, available online at <https://www.deliciousliving.com/health/pyruvate/>, Obtained on Sep. 6, 2017, 2 pages.

Toppan, "Functional products & Energy-related Transparent Barrier Films," Available online at <https://www.toppan.co.jp/living-industry/english/highfunction_energy/barrier_film/>, Obtained on Sep. 23, 2018, 3 pages.

International Search Report and Written Opinion for International Application No. PCT/US2019/60135 dated Jan. 29, 2020, 11 pages.

Cerisuelo et al., (2013). "Describing and modeling the release of an antimicrobial agent from an active PP/EVOH/PP package for salmon," Journal of Food Engineering, 116(2):352-361.

Cerisuelo et al., (2012). "Mathematical model to describe the release of an antimicrobial agent from an active package constituted by carvacrol in a hydrophilic EVOH coating on a PP film," Journal of Food Engineering, 110:26-37.

Extended European Search Report and Written Opinion received for European Patent Application No. 19881486.5 dated Jul. 12, 2022, 8 pages.

International Search Report and Written Opinion for International Application No. PCT/US2021/026121 dated Aug. 2, 2021, 22 pages.

International Search Report and Written Opinion for International Application No. PCT/US2021/072474 dated Feb. 18, 2022, 10 pages.

Krepker et al., (2018). "Antimicrobial LDPE/EVOH Layered Films Containing Carvacrol Fabricated by Multiplication Extrusion," Polymers, 10:864, 14 pages.

U.S. Unpublished U.S. Appl. No. 18/252,474, filed Nov. 17, 2021, titled Packaging System With Controlled Release of Active Agent, (Copy not submitted herewith pursuant to the waiver of 37 C.F.R. § 1.98(a)(2)(iii)).

U.S. Unpublished U.S. Appl. No. 17/914,708, filed Apr. 7, 2021, titled Laminated Film Materials and Processes for Manufacturing Thereof and Uses Thereof, (Copy not submitted herewith pursuant to the waiver of 37 C.F.R. § 1.98(a)(2)(iii)).

* cited by examiner

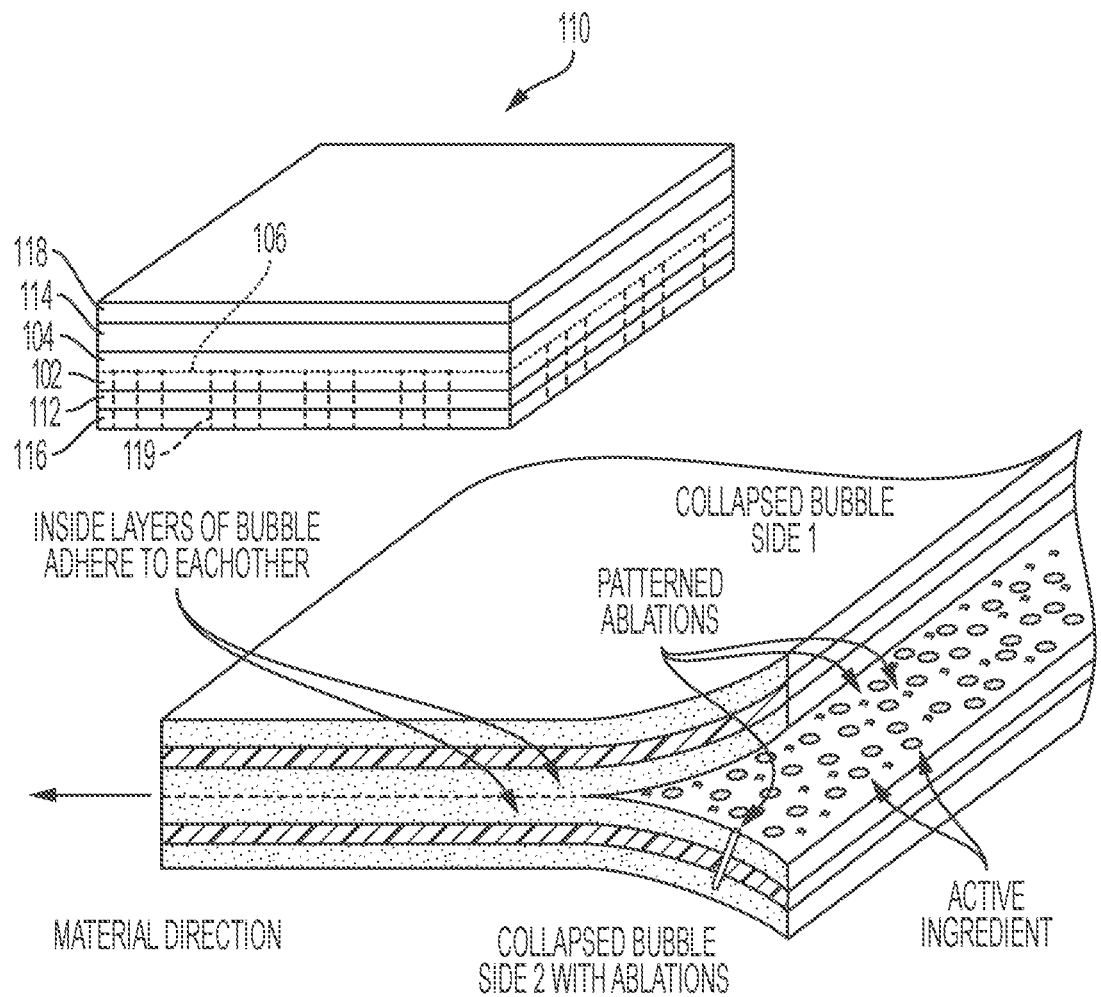
FIG. 4A
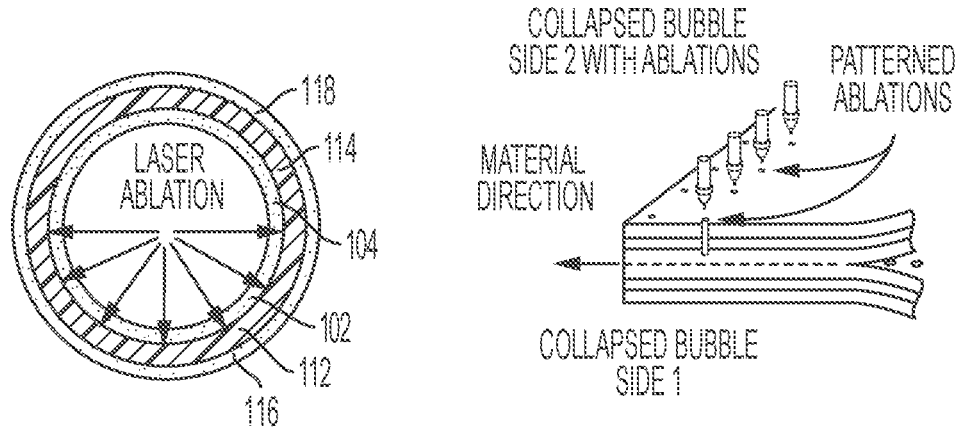
FIG. 4B
FIG. 4C

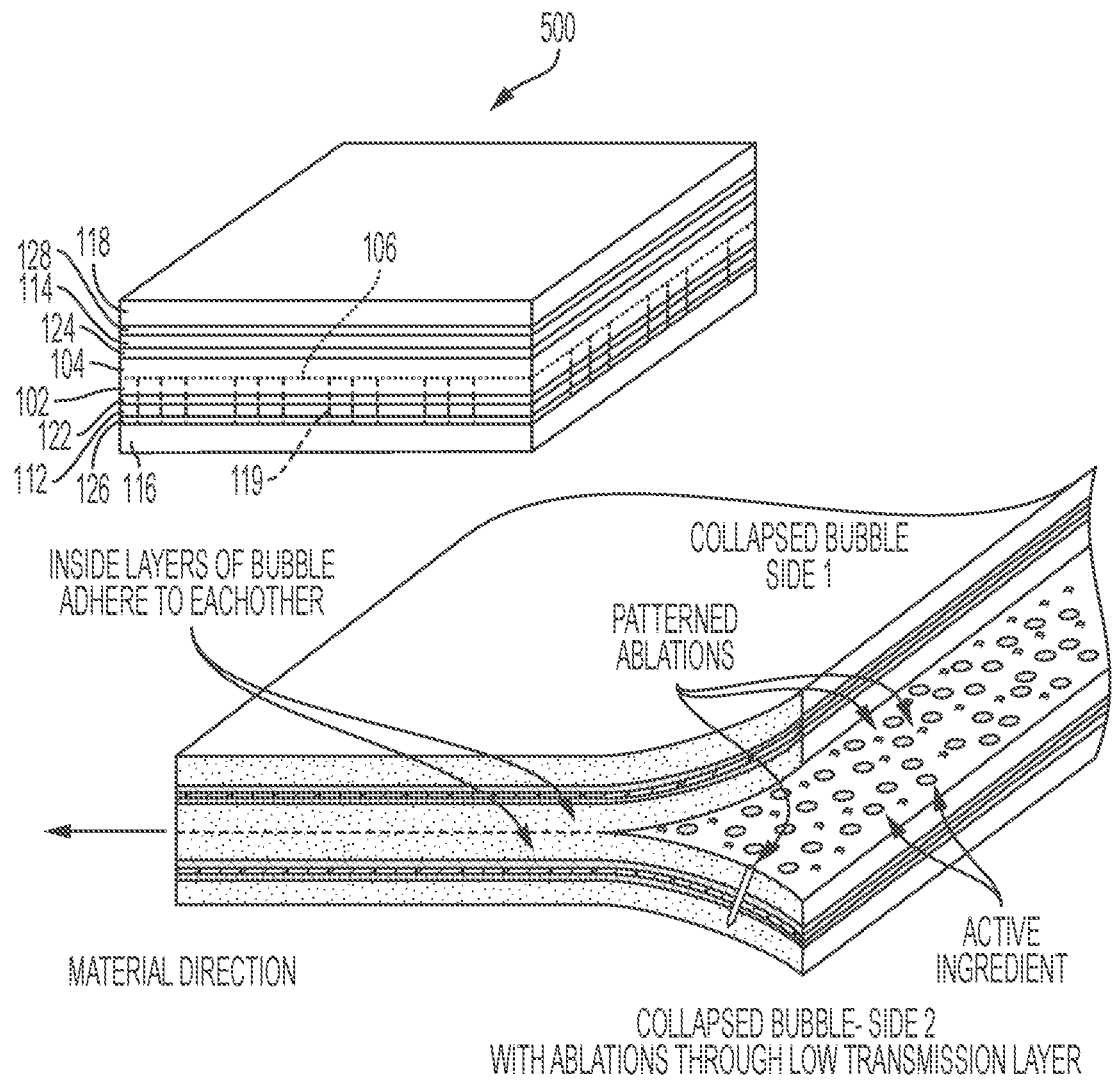
FIG. 5A
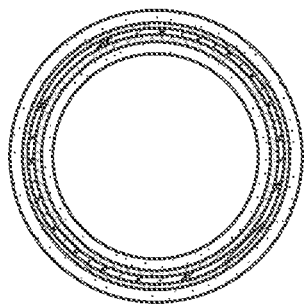
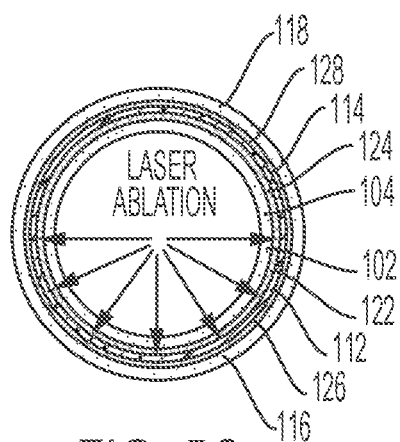
FIG. 5B  FIG. 5C

```
                                          800
                                          ↙

810 ——— Providing molten transmission polymer
                    ↓
812 ——— Extruding the molten transmission polymer
                    ↓
814 ——— Injecting inert gas to expand extruded melt into a bubble
                    ↓
816 ——— Pulling the bubble continuously upwards
                    ↓
818 ——— Dispensing active agent in the interior of the bubble
                    ↓
820 ——— Collapsing the bubble by pulling the bubble between a pair
        of nip rollers
                    ↓
822 ——— Bubble self-adheres to form a blown film with
        active agent encapsulated
```

FIG. 8

BLOWN FILM MATERIALS AND PROCESSES FOR MANUFACTURING THEREOF AND USES THEREOF

CROSS-REFERENCE TO RELATED APPLICATIONS

This application is a national stage application under 35 U.S.C. § 371 of International Application No. PCT/US2019/060135, filed internationally on Nov. 6, 2019, which claims priority to and the benefit of U.S. Provisional Application No. 62/758,012, filed on Nov. 9, 2018, each of which is incorporated herein by reference in its entirety.

FIELD

The present disclosure relates generally to blown films, and more specifically to blown films with anti-microbial properties, suitable for use as food packaging materials.

BACKGROUND

As consumers are increasingly aware of the benefits of a healthy diet, there is a growing demand for fresh, quality, and nutritious food. Preservation and quality maintenance of fresh food products, however, are major concerns of the food industry, as many fresh food articles such as fruits, vegetables, meats, and dairy products are perishable and have a limited shelf life. The relatively short shelf life of such perishable articles frequently results in elevated production and distribution costs, along with an increased risk of foodborne infectious diseases. To overcome the challenges presented during storage, transportation, and handling of perishable foods, it is desirable to have a functional packaging system that improves food quality and safety by reduction of microbial growth.

Anti-microbial packaging is one such promising technology which involves integrating anti-microbial active agents into food package and subsequently delivering them over time to inhibit the growth of pathogenic microorganisms affecting food products and thereby increasing the food products' shelf life. There have been a number of strategies developed for anti-microbial packaging: contact anti-microbial packaging, where anti-microbial agents such as silver or triclosan are embedded into the inner layer of the packaging film and the film contacts against the food to prevent the growth of bacteria at the interface; vapor evolution films, where volatile ingredients are embedded in the film of a package which evolve into the package after the food is loaded and sealed; coated films, where solid or liquid anti-microbial agents are applied by coating methods onto the surface of the film that comes into contact with food; and microencapsulated actives, where coarcevated ingredients are applied onto the surface of packaging. However, known methods and devices of anti-microbial packaging are limited in their effects in preventing food spoilage, and may damage the flavor, color, odor, texture, and/or other characteristics of the food articles. In addition, the cost of producing such anti-microbial packaging is often inhibitive to wide use of this technology.

Accordingly, there is a need for an improved packaging material that provides effective anti-microbial protection of food products, as well as for an efficient method for producing such material.

BRIEF SUMMARY

Provided herein are film materials with anti-microbial properties suitable for use as food packaging materials, as well as methods for manufacturing these film materials. Such films may be produced by a blown film process.

In some aspects, provided is a film containing two self-adhered transmission layers encapsulating at least one active agent, wherein the at least one active agent is distributed at the interface between the two self-adhered transmission layers, and wherein one of the two self-adhered transmission layers is an interior transmission layer and the other is an exterior transmission layer. In some variations, the at least one active agent is uniformly distributed at the interface.

In one variation, the film further contains an interior barrier layer adjacent to the interior transmission layer and an exterior barrier layer adjacent to the exterior transmission layer, wherein the interior transmission layer and the interior barrier layer are ablated.

In another variation, the film further contains an interior barrier layer adjacent to the interior transmission layer, an interior sealant layer adjacent to the interior barrier layer, an exterior barrier layer adjacent to the exterior transmission layer, and an exterior sealant layer adjacent to the exterior barrier layer, wherein at least the interior transmission layer and the interior barrier layer are ablated.

In yet another variation, the film further contains a first interior tie layer adjacent to the interior transmission layer, an interior barrier layer adjacent to the first interior tie layer, a second interior tie layer adjacent to the interior barrier layer, an interior sealant layer adjacent to the second interior tie layer, a first exterior tie layer adjacent to the exterior transmission layer, an exterior barrier layer adjacent to the first exterior tie layer, a second exterior tie layer adjacent to the exterior barrier layer, and an exterior sealant layer adjacent to the second exterior tie layer, wherein at least the interior transmission layer, the first interior tie layer and the interior barrier layer are ablated.

In still another variation, the film further contains a tie layer and an additional transmission layer having a lower transmission rate than the two self-adhered transmission layers, adjacent to the exterior transmission layer, adjacent to the exterior transmission layer.

In still another variation, the film further contains a first tie layer adjacent to the exterior transmission layer, a barrier layer adjacent to the first tie layer, a second tie layer adjacent to the barrier layer, and a sealant layer adjacent to the second tie layer.

In still another variation, the film further contains a lower transmission coating deposited on the exterior transmission layer.

In some variations that may be combined with the foregoing, each of two self-adhered transmission layers contains an inner transmission sublayer and an outer transmission sublayer, wherein the inner transmission sublayers have a lower melt point than the outer transmission sublayers, and wherein the inner transmission sublayers self-adhere to form the interface of the two self-adhered transmission layers and encapsulate the at least one active agent.

In some embodiments of the foregoing, the film is a blown film.

In some other aspects, provided is a method for manufacturing a film, by:
providing a molten transmission polymer;
extruding the molten transmission polymer through an annular die to form an extruded melt;
injecting an inert gas through a hole in the center of the annular die to cause the extruded melt to expand into a bubble;

pulling the bubble continuously from the annular die;

dispensing at least one active agent in the interior of the bubble using an atomizer; and collapsing the bubble by pulling the bubble between a pair of nip rollers, wherein the bubble self-adheres to form a film, wherein the film comprises two self-adhered transmission layers encapsulating at least one active agent, wherein the at least one active agent is distributed at the interface between the two self-adhered transmission layers.

In some other aspects, provided is a method for manufacturing a film, by:

combining a molten transmission polymer, a molten barrier polymer, and a molten sealant polymer in a feedblock;

co-extruding the molten transmission polymer, the molten barrier polymer, and the molten sealant polymer from the feedblock through an annular die to form a multi-layered extruded melt, wherein:

the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt;

injecting an inert gas through a hole in the center of the annular die to cause the multi-layered extruded melt to expand into a bubble, pulling the bubble continuously from the annular die;

dispensing at least one active agent in the interior of the bubble using an atomizer;

ablating one side of the interior of the bubble using a laser; and collapsing the ablated bubble by pulling the bubble between a pair of nip rollers, wherein the bubble self-adheres to form a film, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the film further comprises:

an interior barrier layer adjacent to the interior transmission layer;

an interior sealant layer adjacent to the interior barrier layer;

an exterior barrier layer adjacent to the exterior transmission layer;

an exterior sealant layer adjacent to the exterior barrier layer, and wherein the interior transmission layer, the interior barrier layer, and the interior sealant layer are ablated.

In some other aspects, provided is a method for manufacturing a film, by:

combining a molten transmission polymer, a molten barrier polymer, and a molten sealant polymer in a feedblock;

co-extruding the molten transmission polymer, the molten barrier polymer, and the molten sealant polymer from the feedblock through an annular die to form a multi-layered extruded melt, wherein:

the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt;

injecting an inert gas through a hole in the center of the annular die to cause the multi-layered extruded melt to expand into a bubble, pulling the bubble continuously from the annular die;

dispensing at least one active agent in the interior of the bubble using an atomizer;

ablating one side of the interior of the bubble using a laser; and collapsing the ablated bubble by pulling the bubble between a pair of nip rollers, wherein the bubble self-adheres to form a film, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the film further comprises:

an interior barrier layer adjacent to the interior transmission layer;

an interior sealant layer adjacent to the interior barrier layer;

an exterior barrier layer adjacent to the exterior transmission layer;

an exterior sealant layer adjacent to the exterior barrier layer, and wherein the interior transmission layer, the interior barrier layer, and the interior sealant layer are ablated.

In some other aspects, provided is a method for manufacturing a film, by:

combining a molten transmission polymer, a molten barrier polymer, and a molten sealant polymer in a feedblock;

co-extruding the molten transmission polymer, the molten barrier polymer, and the molten sealant polymer from the feedblock through an annular die to form a multi-layered extruded melt, wherein:

the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt;

injecting an inert gas through a hole in the center of the annular die to cause the multi-layered extruded melt to expand into a bubble, pulling the bubble continuously from the annular die;

dispensing at least one active agent in the interior of the bubble using an atomizer;

collapsing the bubble by pulling the bubble between a pair of nip rollers, wherein the bubble self-adheres to form a film; and ablating one side of the film using a laser, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the film further comprises:
an interior barrier layer adjacent to the interior transmission layer;
an interior sealant layer adjacent to the interior barrier layer;
an exterior barrier layer adjacent to the exterior transmission layer;
an exterior sealant layer adjacent to the exterior barrier layer, and
wherein the interior transmission layer, the interior barrier layer, and the interior sealant layer are ablated.

In some other aspects, provided is a method for manufacturing a film, by:

combining a molten transmission polymer, a first molten tie polymer, a molten barrier polymer, a second molten tie polymer, and a molten sealant polymer in a feedblock;

co-extruding the molten transmission polymer, the first molten tie polymer, the molten barrier polymer, the second molten tie polymer, and the molten sealant polymer from the feedblock through an annular die to form a multi-layered extruded melt, wherein:

the molten transmission polymer is extruded as a transmission layer on the inside of the multi-layered extruded melt, the molten sealant polymer is extruded as a sealant layer on the outside of the multi-layered extruded melt, the molten barrier polymer is extruded as a barrier layer in between the transmission layer and the sealant layer of the multi-layered extruded melt, the first molten tie polymer is extruded as a first tie layer in between the transmission layer and the barrier layer, and the second molten tie polymer is extruded as a second time layer in between the barrier layer and the sealant layer;

injecting an inert gas through a hole in the center of the annular die to cause the multi-layered extruded melt to expand into a bubble, pulling the bubble continuously from the annular die;

dispensing at least one active agent in the interior of the bubble using an atomizer;

ablating one side of the interior of the bubble using a laser; and collapsing the ablated bubble by pulling the bubble between a pair of nip rollers, wherein the bubble self-adheres to form a film, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the film further comprises:

a first interior tie layer adjacent to the interior transmission layer;

an interior barrier layer adjacent to the first interior tie layer;

a second interior tie layer adjacent to the interior barrier layer;

an interior sealant layer adjacent to the second interior tie layer;

a first exterior tie layer adjacent to the exterior transmission layer;

an exterior barrier layer adjacent to the first exterior tie layer;

a second exterior tie layer adjacent to the exterior barrier layer;

an exterior sealant layer adjacent to the second exterior tie layer;

wherein the interior transmission layer, the first interior tie layer, the interior barrier layer, the second interior tie layer, and the interior sealant layer are ablated.

In some other aspects, provided is a method for manufacturing a film, by:

combining a molten transmission polymer, a first molten tie polymer, a molten barrier polymer, a second molten tie polymer, and a molten sealant polymer in a feedblock;

co-extruding the molten transmission polymer, the first molten tie polymer, the molten barrier polymer, the second molten tie polymer, and the molten sealant polymer from the feedblock through an annular die to form a multi-layered extruded melt, wherein:

the molten transmission polymer is extruded as a transmission layer on the inside of the multi-layered extruded melt, the molten sealant polymer is extruded as a sealant layer on the outside of the multi-layered extruded melt, the molten barrier polymer is extruded as a barrier layer in between the transmission layer and the sealant layer of the multi-layered extruded melt, the first molten tie polymer is extruded as a first tie layer in between the transmission layer and the barrier layer, and the second molten tie polymer is extruded as a second time layer in between the barrier layer and the sealant layer;

injecting an inert gas through a hole in the center of the annular die to cause the multi-layered extruded melt to expand into a bubble, pulling the bubble continuously from the annular die;

dispensing at least one active agent in the interior of the bubble using an atomizer;

collapsing the bubble by pulling the bubble between a pair of nip rollers, wherein the bubble self-adheres to form a film; and ablating one side of the film using a laser, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the film further comprises:
a first interior tie layer adjacent to the interior transmission layer;
an interior barrier layer adjacent to the first interior tie layer;
a second interior tie layer adjacent to the interior barrier layer;
an interior sealant layer adjacent to the second interior tie layer;
a first exterior tie layer adjacent to the exterior transmission layer;
an exterior barrier layer adjacent to the first exterior tie layer;
a second exterior tie layer adjacent to the exterior barrier layer;
an exterior sealant layer adjacent to the second exterior tie layer;
wherein the interior transmission layer, the first interior tie layer, the interior barrier layer, the second interior tie layer, and the interior sealant layer are ablated.

In some other aspects, provided is a method for manufacturing a film, by:
combining a molten transmission polymer, a molten tie polymer, and an additional molten transmission polymer having a lower transmission rate;
co-extruding the molten transmission polymer, the molten tie polymer, and the additional molten transmission polymer from the feedblock through an annular die to form a multi-layered extruded melt, wherein:
the molten transmission polymer is extruded as a transmission layer, and
the molten tie polymer and the additional molten transmission polymer having the lower transmission rate are extruded on one side of the annular die as a tie layer and an additional transmission layer;
injecting an inert gas through a hole in the center of the annular die to cause the multi-layered extruded melt to expand into a bubble,
pulling the bubble continuously from the annular die;
dispensing at least one active agent in the interior of the bubble using an atomizer;
collapsing the bubble by pulling the bubble between a pair of nip rollers, wherein the bubble self-adheres to form a film,
wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the additional transmission layer having the lower transmission rate is adjacent to the exterior transmission layer.

In some other aspects, provided is a method for manufacturing a film, by:

combining a molten transmission polymer and an additional molten transmission polymer having a lower melt point;

co-extruding the molten transmission polymer and the additional molten transmission polymer from the feedblock through an annular die to form a multi-layered extruded melt, wherein:

the molten transmission polymer is extruded as an outer transmission sublayer, and the additional molten transmission polymer having the lower melt point is extruded as an inner transmission sublayer;

injecting an inert gas through a hole in the center of the annular die to cause the multi-layered extruded melt to expand into a bubble, pulling the bubble continuously from the annular die;

dispensing at least one active agent in the interior of the bubble using an atomizer;

collapsing the bubble by pulling the bubble between a pair of nip rollers, wherein the bubble self-adheres to form a film, wherein the film comprises two self-adhered transmission layers, each comprising an inner transmission sublayer and an outer transmission sublayer, wherein the inner transmission sublayers have a lower melt point than the outer transmission sublayers, and wherein the inner transmission sublayers form the interface of the two self-adhered transmission layers and encapsulate the at least one active agent.

DESCRIPTION OF THE FIGURES

The present application can be best understood by reference to the following description taken in conjunction with the accompanying figures, in which like parts may be referred to by like numerals.

FIG. 1A depicts an exemplary film with two self-adhered transmission layers encapsulating at least one active agent.

FIG. 1B depicts another exemplary film with two self-adhered transmission layers encapsulating at least one active agent, as well as additional barrier and sealant layers. Note ablations on one side of the film.

FIG. 1C depicts another exemplary film with two self-adhered transmission layers encapsulating at least one active agent, as well as additional barrier, sealant, and tie layers. Note ablations on one side of the film.

FIG. 1D depicts another exemplary film with two self-adhered transmission layers encapsulating at least one active agent, as well as additional barrier, sealant and tie layers, wherein no interface is visually discernable between the two self-adhered transmission layers.

FIG. 1E depicts another exemplary film with two self-adhered transmission layers encapsulating at least one active agent, as well as additional barrier layer on one side of the film.

FIG. 1F depicts another exemplary film with two self-adhered transmission layers encapsulating at least one active agent, as well as additional inorganic coating.

FIG. 1G depicts another exemplary film with two self-adhered transmission layers encapsulating at least one active agent, as well as additional deposition coating.

FIG. 1H depicts another exemplary film with two self-adhered transmission layers encapsulating at least one active agent. In this exemplary film, each of two self-adhered transmission layers is made up of an inner transmission sublayer and an outer transmission sublayer, wherein the inner transmission sublayers have a lower melt point than the outer transmission sublayers, and wherein the inner transmission sublayers self-adhere to form the interface of the two self-adhered transmission layers and encapsulate the at least one active agent.

FIG. 2A illustrates an exemplary process of manufacturing the film as depicted in FIG. 1C.

FIG. 2B illustrates an exemplary process of extrusion of polymers.

FIG. 2C illustrates three types of laser ablations: laser scoring, laser cutting, and laser micro-perforation.

FIG. 2D illustrates an exemplary process of manufacturing a blown film. In some variations, a liquid dispersion device (LDD) that atomizes an active ingredient (e.g. ethyl pyruvate) is positioned within inside the blown bubble. In some variations, a laser ablator may be positioned inside the blown bubble.

FIG. 3A depicts the cross-section view of the exemplary film; and FIG. 3B depicts laser ablation inside the blown bubble before it is collapsed to form a film.

Figure 1A:
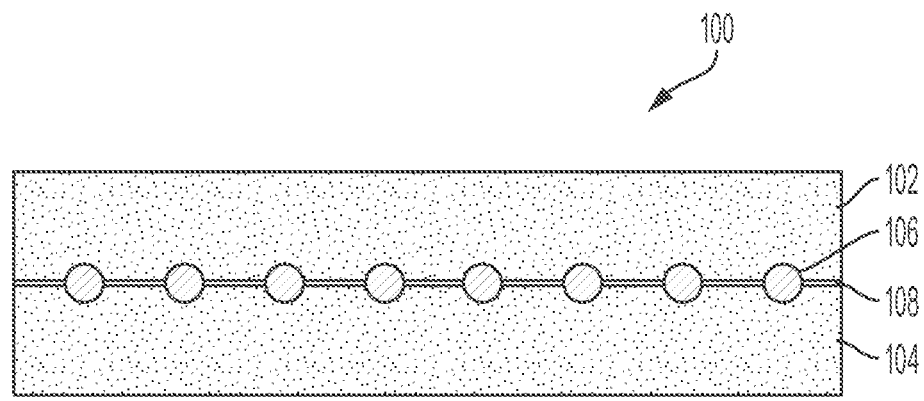
Figure 1B:
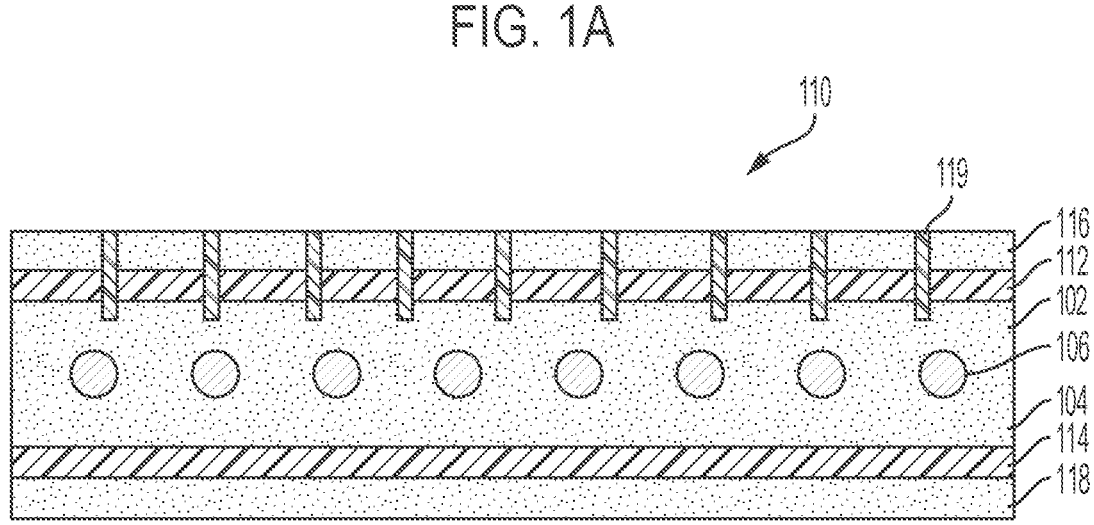

FIG. 4A, FIG. 4B, and FIG. 4C show again the exemplary film in FIG. 1B. FIG. 4A depicts the cross-section view of the exemplary film; FIG. 4B depicts laser ablation inside the blown bubble before it is collapsed to form a film; and FIG. 4C depicts laser ablation performed after the film is formed.

FIG. 5A, FIG. 5B, and FIG. 5C show another exemplary film with two self-adhered transmission layers encapsulating at least one active agent, as well as additional barrier, sealant and tie layers. FIG. 5A depicts the cross-section view of the exemplary film; FIG. 5B depicts the cross-section view of blown bubble with the different layers; and FIG. 5C depicts laser ablation inside the blown bubble before it is collapsed to form a film.

Figure 6A:
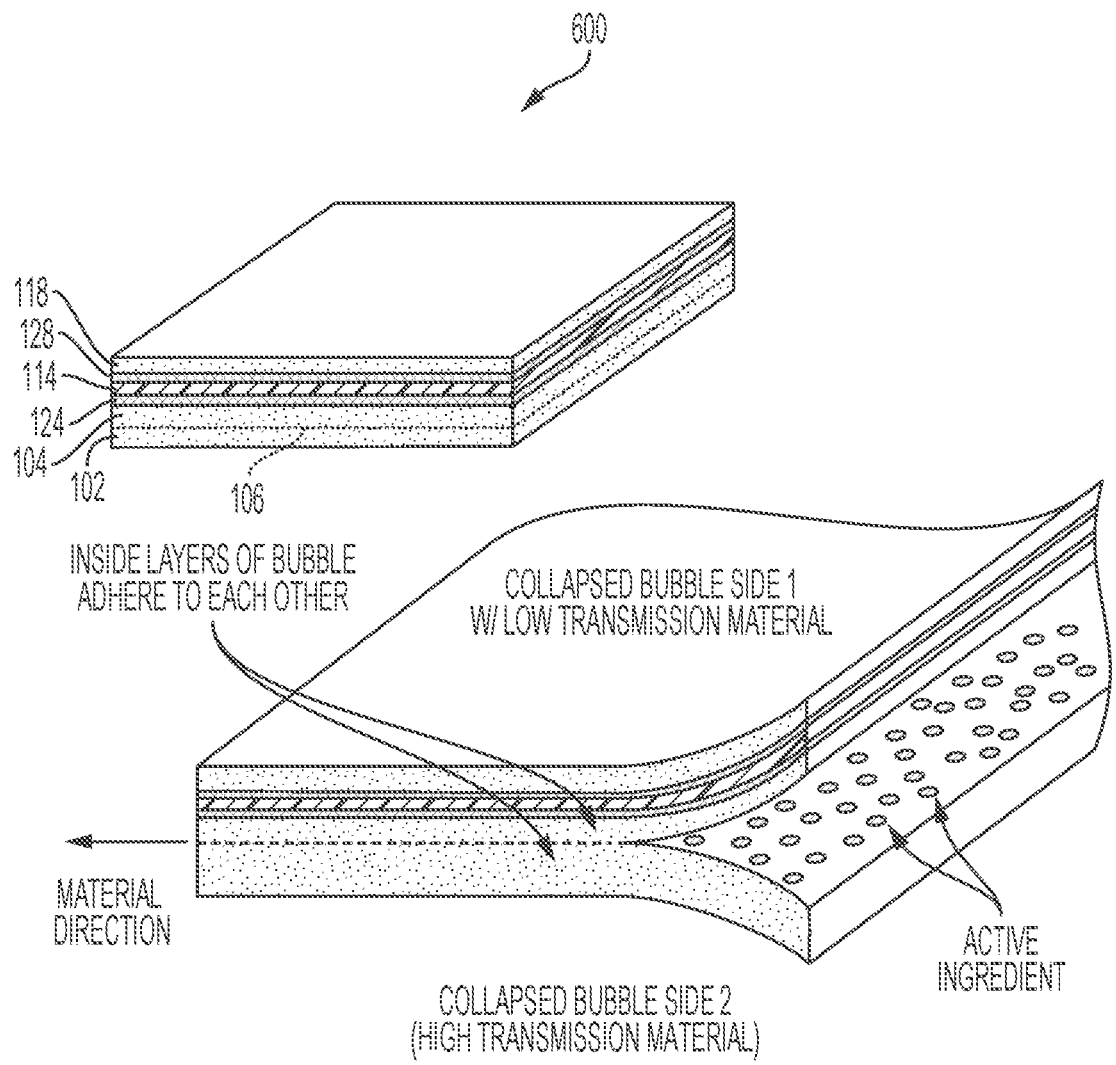
Figure 6B:
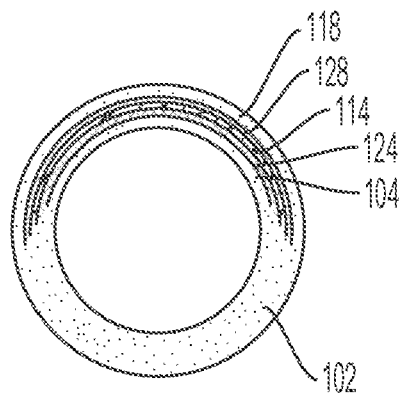

FIG. 6A and FIG. 6B show an exemplary film from an asymmetrical co-extrusion process, with two self-adhered transmission layers encapsulating at least one active agent, as well as additional barrier, sealant and tie layers. FIG. 6A depicts the cross-section view of the exemplary film; and FIG. 6B depicts the cross-section view of blown bubble with the different layers.

Figure 7A:
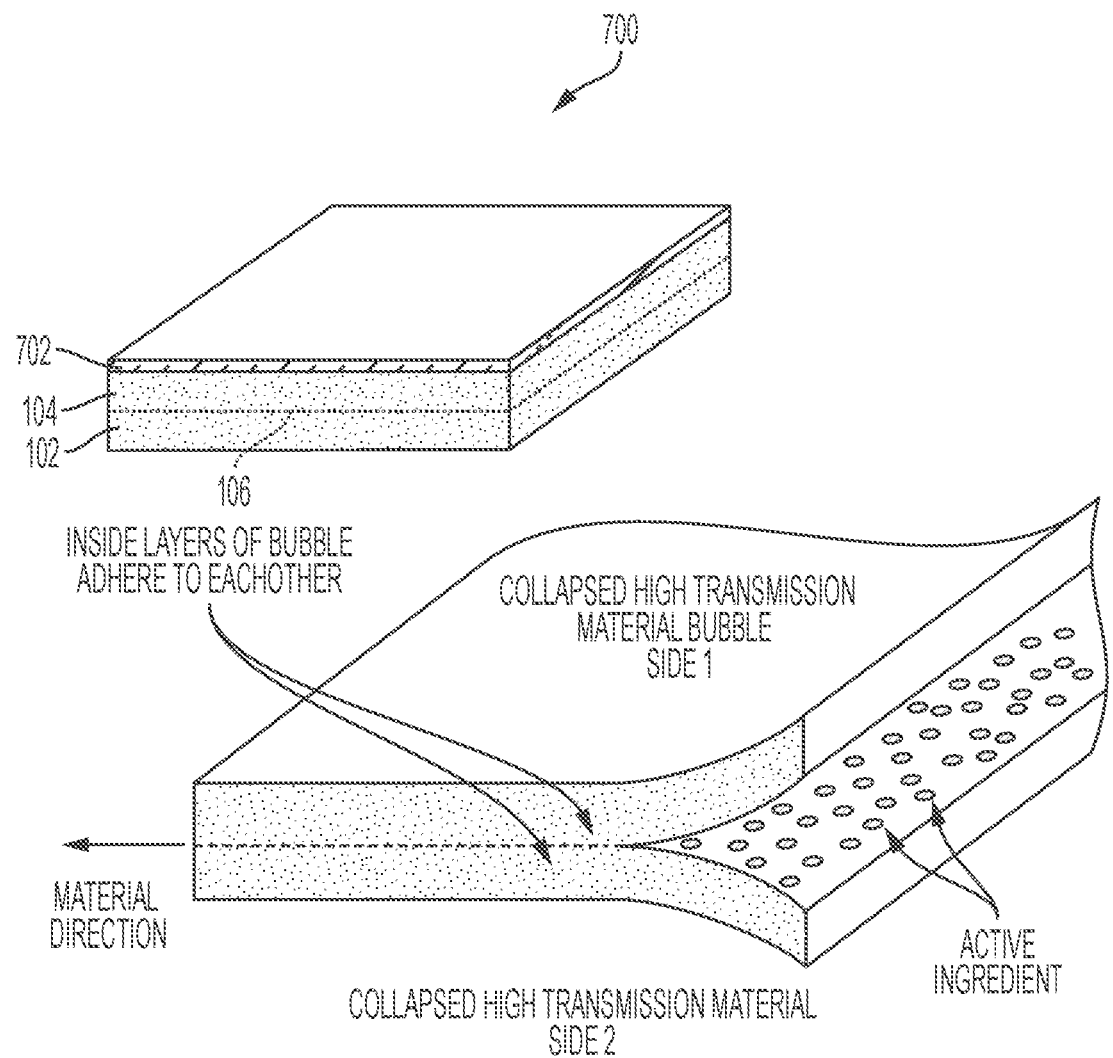
Figure 7B:
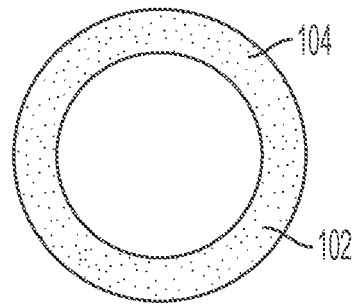

FIG. 7A and FIG. 7B show another exemplary film with two self-adhered transmission layers encapsulating at least one active agent, as well as additional coating. FIG. 7A depicts the cross-section view of the exemplary film; and FIG. 7B depicts the cross-section view of blown bubble with the two transmission layers.

FIG. 8 shows the flowchart for an exemplary method for manufacturing the film as depicted in FIG. 1A.

Figure 9:
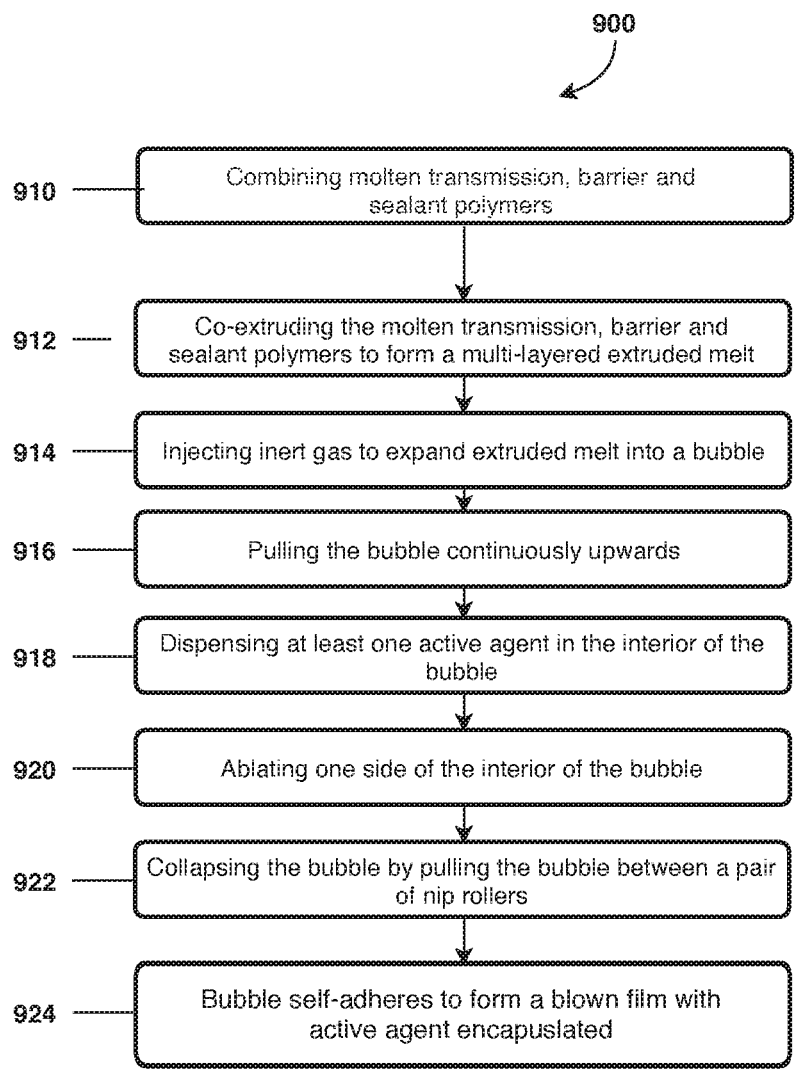

FIG. 9 shows the flowchart for an exemplary method for manufacturing the film, wherein ablation takes place inside the blown bubble before it is collapsed to form the film.

Figure 10:
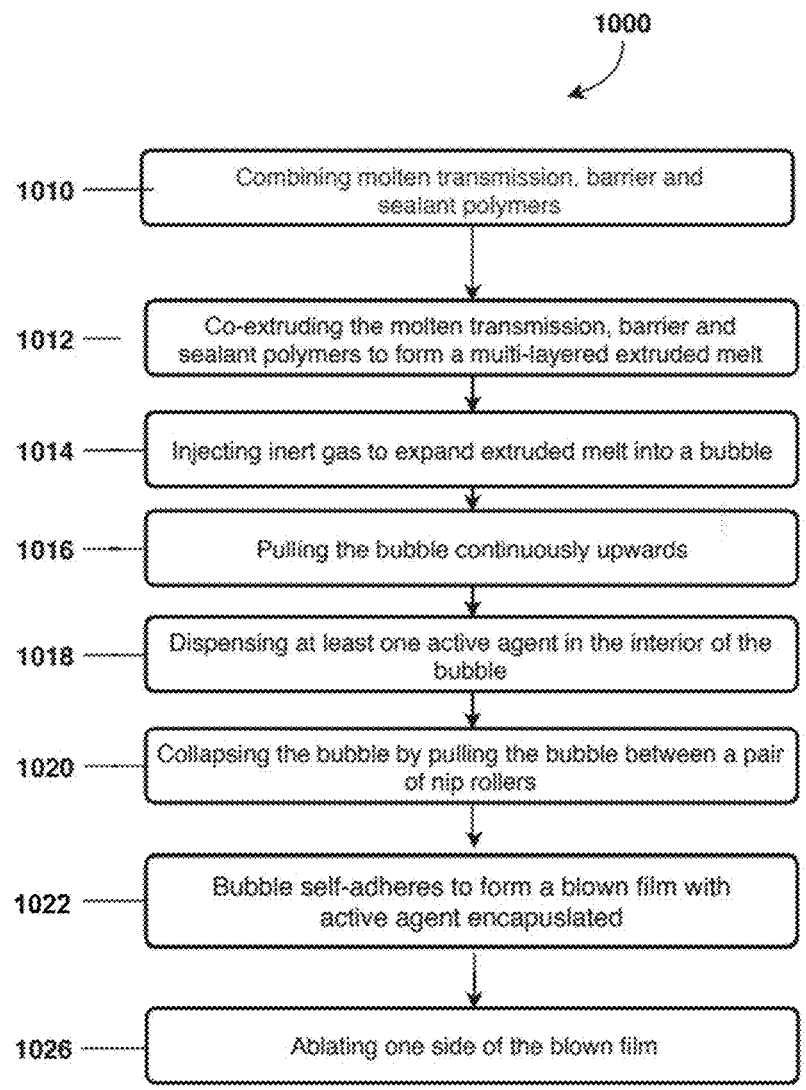

FIG. 10 shows the flowchart for another exemplary method for manufacturing the film as depicted in FIG. 1B, wherein ablation takes place after the film is formed.

Figure 11:
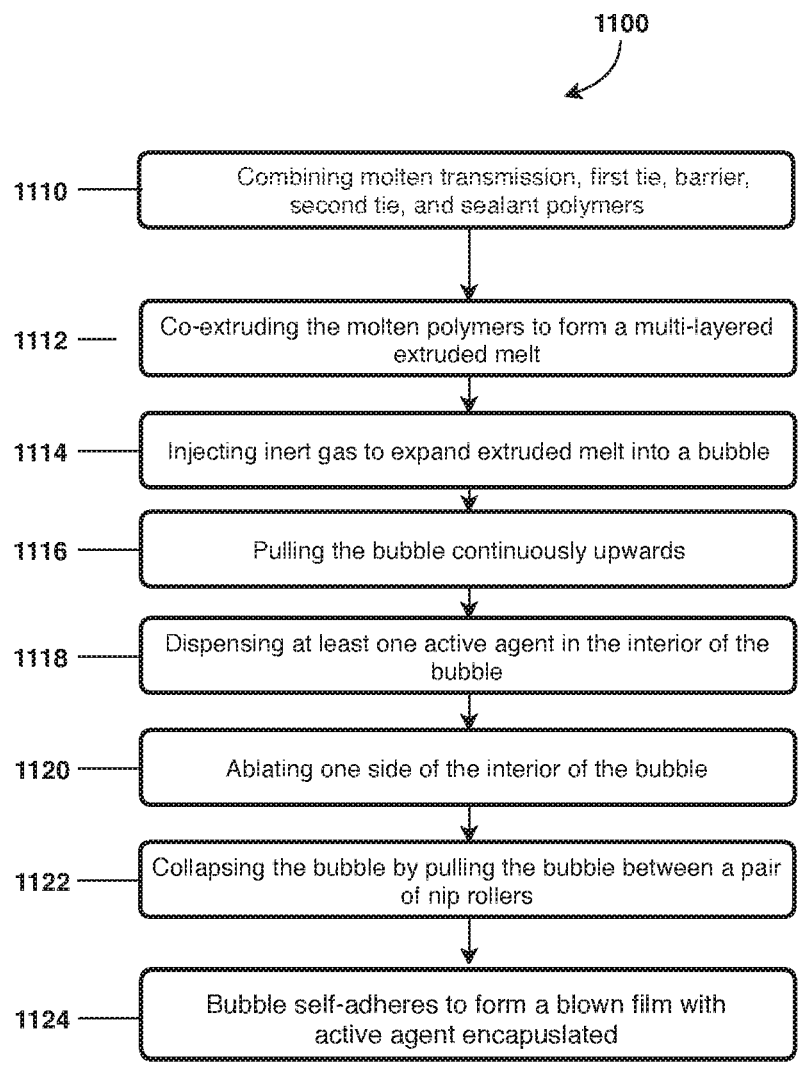

FIG. 11 shows the flowchart for an exemplary method for manufacturing the films, wherein ablation takes place inside the blown bubble before it is collapsed to form the film.

Figure 1C:
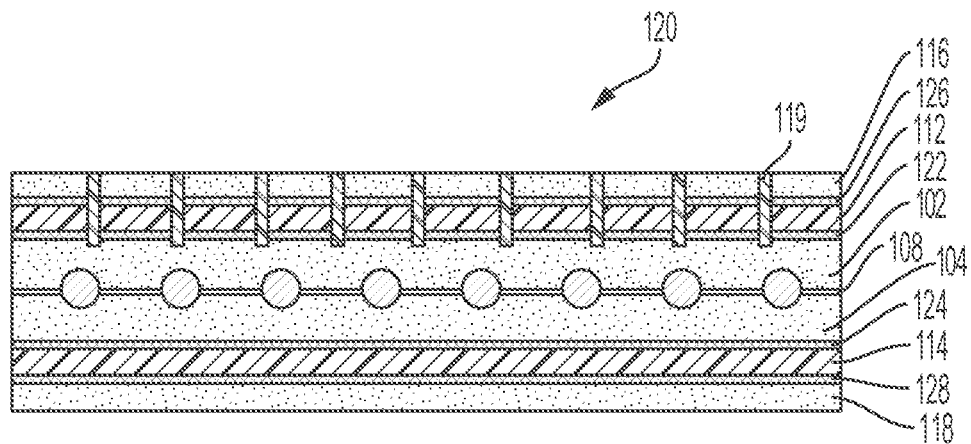
Figure 1D:
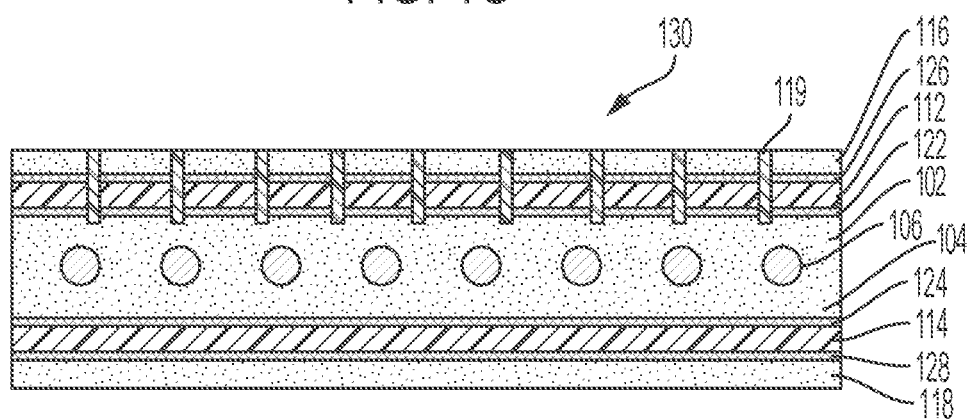
Figure 12:
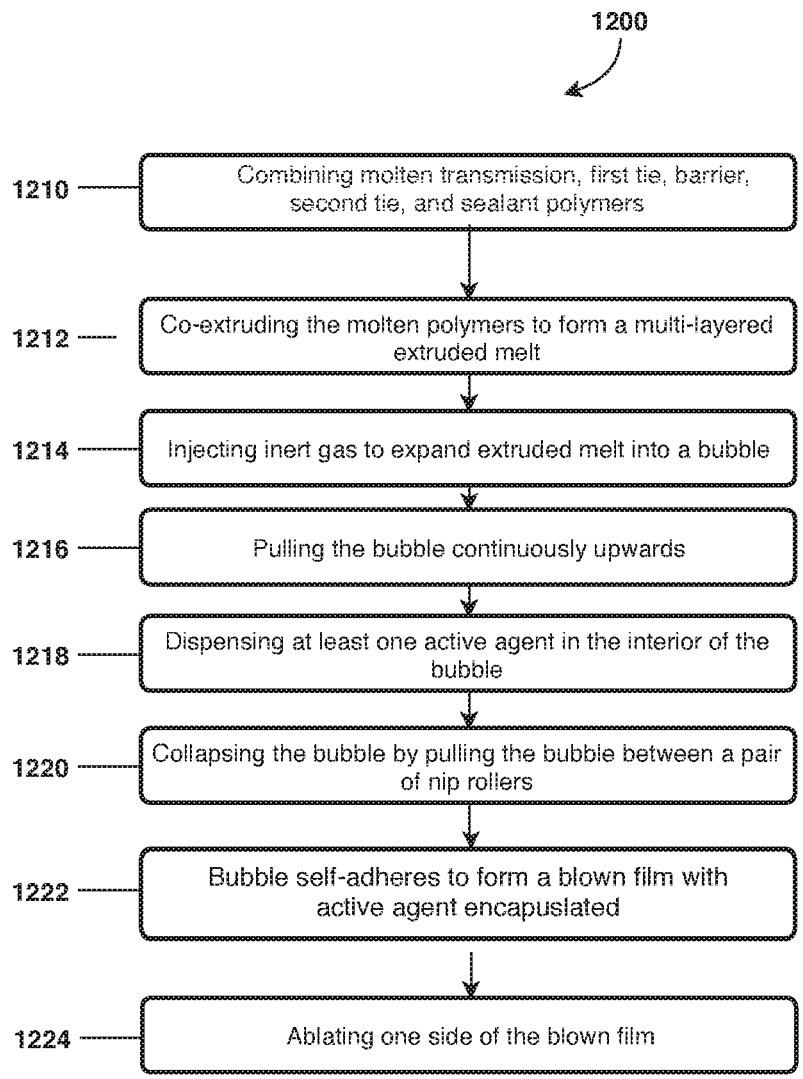

FIG. 12 shows the flowchart for another exemplary method for manufacturing the films as depicted in FIG. 1C and FIG. 1D, wherein ablation takes place after the film is formed.

Figure 1E:
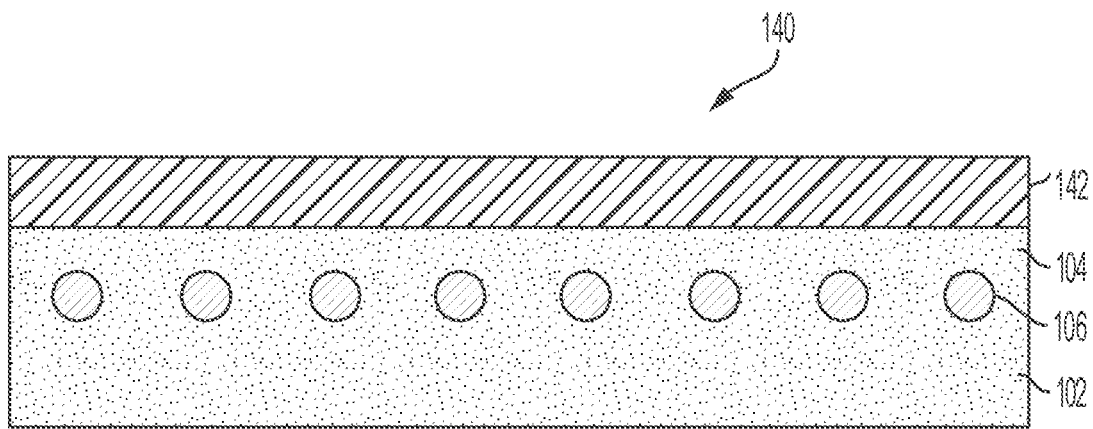
Figure 13:
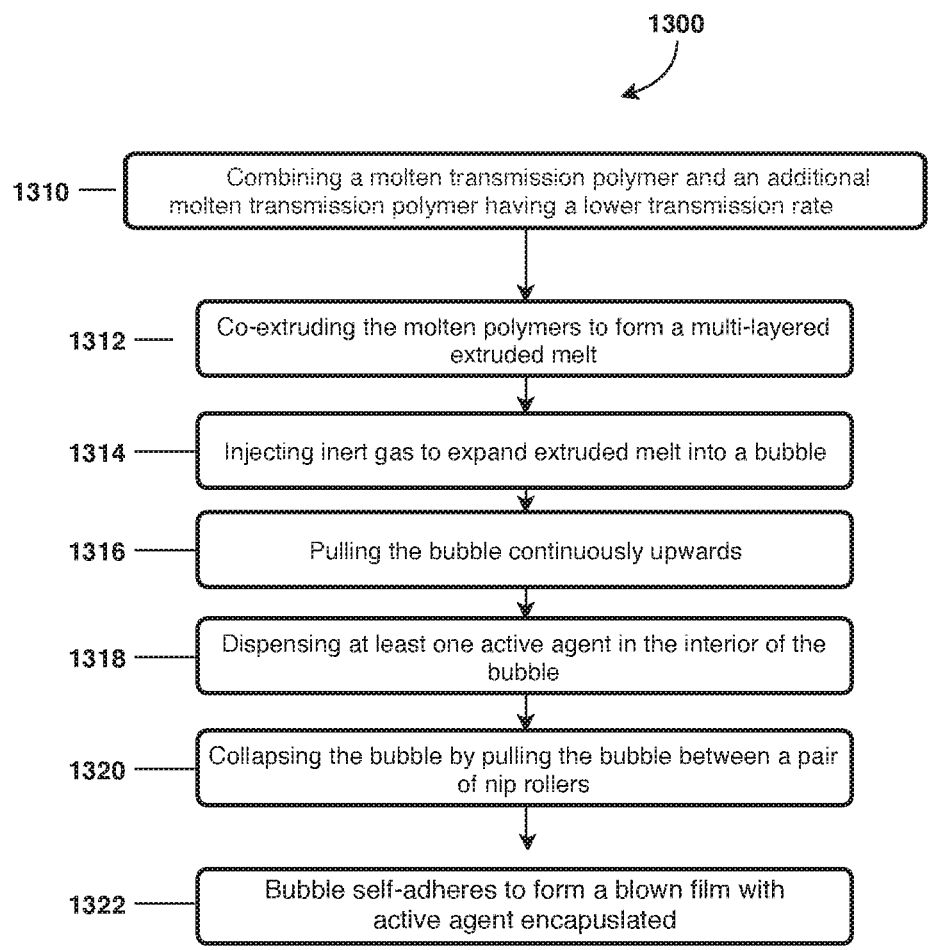

FIG. 13 shows the flowchart for an exemplary method for manufacturing the film as depicted in FIG. 1E by asymmetrical co-extrusion.

Figure 1F:
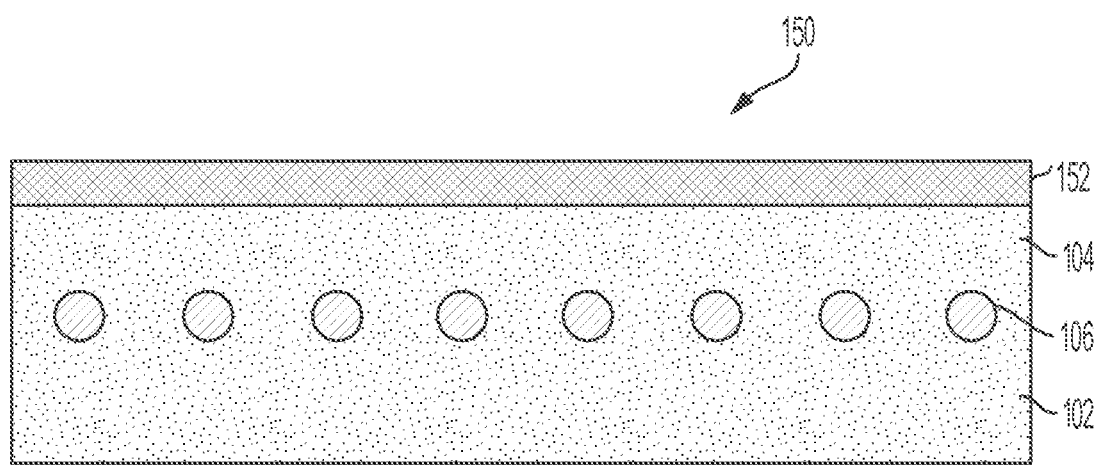
Figure 1G:
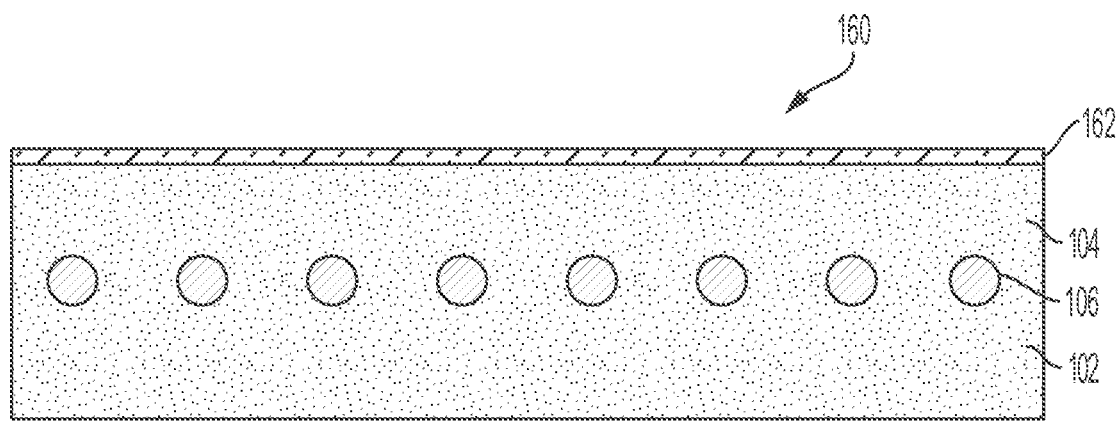
Figure 14:
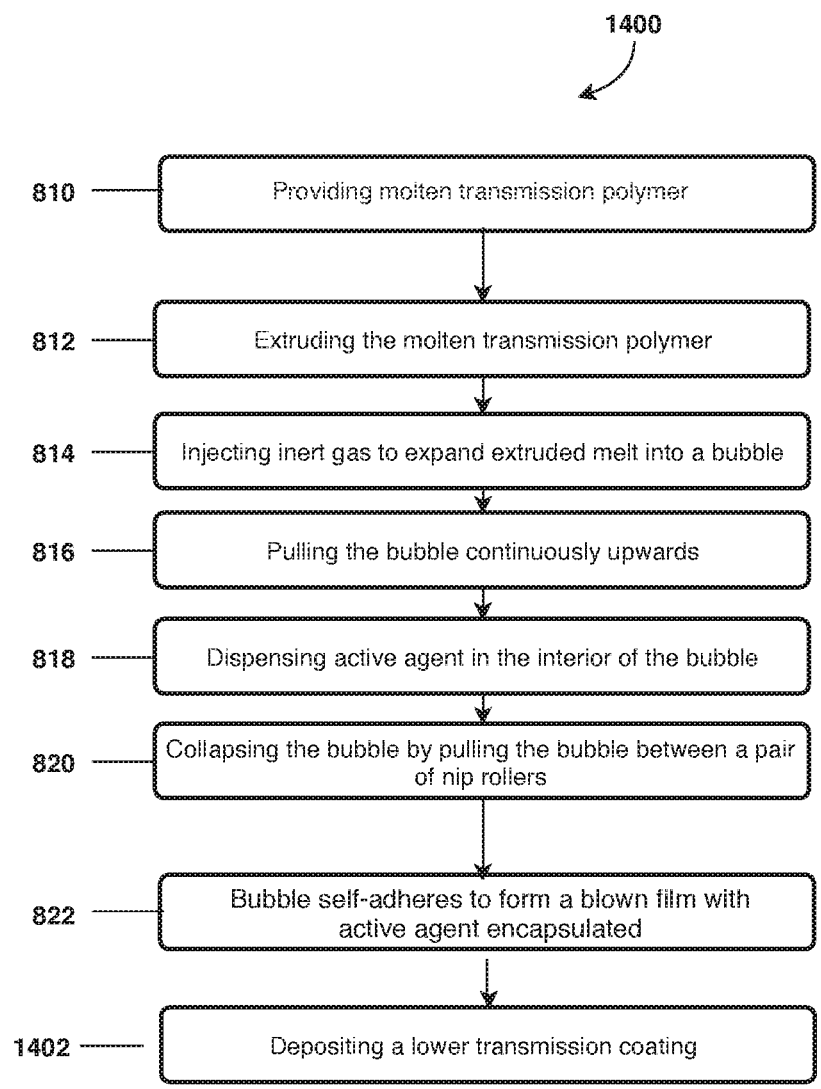

FIG. 14 shows the flowchart for an exemplary method for manufacturing the films as depicted in FIG. 1F and FIG. 1G with coating.

Figure 1H:
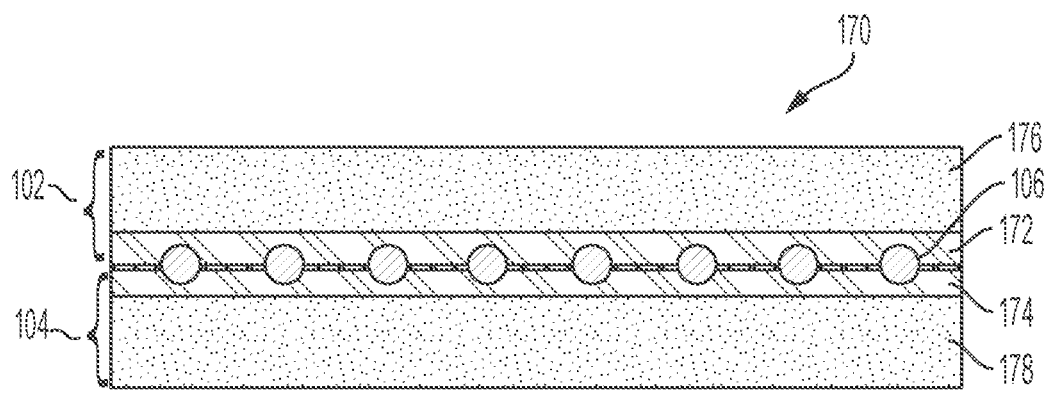
Figure 15:
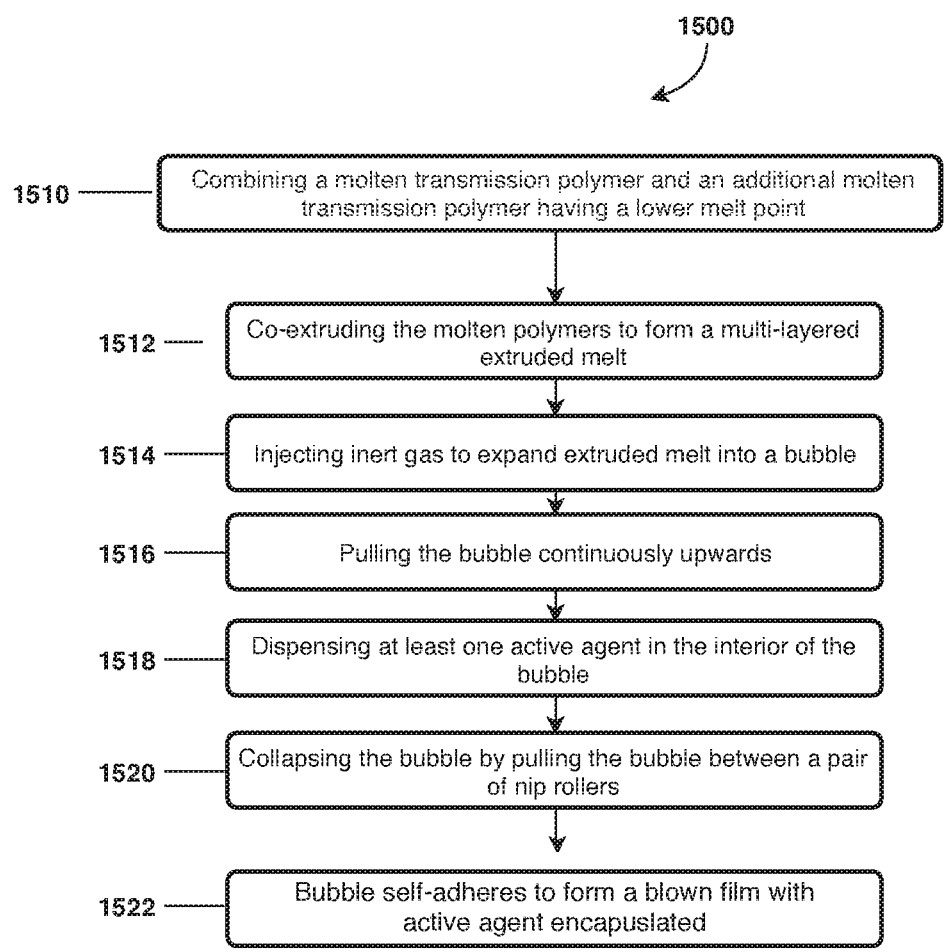

FIG. 15 shows the flowchart for an exemplary method for manufacturing the film as depicted in FIG. 1H with sublayers having a lower melting point.

DETAILED DESCRIPTION

The following description sets forth exemplary compositions, systems, methods, parameters and the like. It should be recognized, however, that such description is not intended as a limitation on the scope of the present disclosure but is instead provided as a description of exemplary embodiments.

Provided herein are films with anti-microbial properties, suitable for use as food packaging materials. Such films may be manufactured using a blown film process. In some aspects, the films are made up of two self-adhered transmission layers encapsulating at least one active agent. In some variations, the active agent is an anti-microbial agent, such as ethyl pyruvate. The at least one active agent is distributed at the interface between the two self-adhered transmission layers. In one variation, the at least one active agent is uniformly distributed at the interface between the two self-adhered transmission layers. In other embodiments, the blown films may include one or more additional layers, such as additional barrier, sealant and/or tie layers. The various compositions of the blown films are described in further detail below.

Provided herein are also methods of manufacturing such films. In certain aspects, the blown films described herein are generally manufactured by providing a molten transmission polymer; extruding the molten transmission polymer through an annular die to form an extruded melt; injecting an inert gas through a hole in the center of the annular die to cause the extruded melt to expand into a bubble; pulling the bubble continuously from the annular die; dispensing at least one active agent in the interior of the bubble using an atomizer; and collapsing the bubble by pulling the bubble between a pair of nip rollers, wherein the bubble self-adheres to form the blown films. In some variations, the bubble may be pulled continuously upwards or downwards from the annular die, depending on the configuration of the equipment. In other embodiments, the methods may include one or more additional steps, including steps to incorporate one or more additional layers (such as additional barrier, sealant and/or tie layers) into the film, and steps to create ablations in certain parts of the blown film. The various methods to manufacture the blown films are also described in further detail below.

Blown Film Compositions

In some embodiments, provided is a blown film comprising: two self-adhered transmission layers encapsulating at least one active agent, wherein the at least one active agent is distributed at the interface between the two self-adhered transmission layers. In one variation, the at least one active agent is uniformly distributed at the interface between the two self-adhered transmission layers With reference to FIG. 1A, an exemplary blown film is depicted. Blown film 100 is made up of self-adhered transmission layers 102 and 104, and these two layers encapsulate active agent 106. The active agent is distributed at interface 108 between self-adhered transmission layers 102 and 104.

As used herein, the term "self-adhesion" or "self-adhered" refers to the property of a surface of a material to adhere, stick, or bond to the surface of the same material without the need for a separate adhesive or other support agent. As used herein, "adhesion" refers to the property of a surface of a material to stick or bond to the surface of another material under the influence of high temperatures, such as a temperature higher than room temperature or operating temperature. Adhesion can be measured, e.g., by ASTM F88-15. As used herein, "adhesive" refers to any composition or structure capable of providing the degree of adhesion required between two materials. Examples of adhesives include polyolefins, polyvinyl acetate polyamides, hydrocarbon resins, waxes, natural asphalts, styrenic rubbers, and blends thereof. Importantly, a desirable characteristic of the adhesion as used herein is that the strength of the material before adhesion and after adhesion is the same. In some variations, self-adhesion may be achieved using heat, mechanical forces, or solvents.

In some embodiments, the transmission layers are high transmission rate materials. As used herein, in some variations, the term "transmission rate" refers to the quantity of gas or vapor that is able to pass through a specific area of material over a specified period of time. Examples of gas or vapor include $O_2$, $N_2$, helium, moisture, organic vapor, polar vapor, non-polar vapor. In other variations, the term "transmission rate" refers to the quantity of liquid that is able to pass through a specific area of material over a specified period of time. The transmission rate is different for each gas or vapor or liquid, which can be tested using different sensors. For the purpose of this disclosure, "moisture vapor transmission rate" (MVTR) or "oxygen transmission rate" (OTR) may be used as proxy for the transmission rate of an active ingredient through a material. As used herein, the term "moisture vapor transmission rate" (MVTR) or "water vapor transmission rate" (WVTR) refers to the rate at which water vapor permeates through a material at specified conditions of temperature and relative humidity, which may be determined according to the test procedure standardized by INDA (Association of the Nonwoven Fabrics Industry), number IST-70.4-99, which is known to those skilled in the art and incorporated by reference herein. MVTR or WVTR is typically measured in the unit of $g/m^2/day$ or $g/in^2/day$. As used herein, the term "oxygen transmission rate" (OTR) refers to the rate at which oxygen gas permeates through a material at specified conditions of temperature and relative humidity. OTR is typically measured in the unit of $cc/m^2/day$ or $cc/in^2/day$. Any suitable techniques known in the art to determine vapor transmission rates may be employed. For example, a pouch of the transmission layer is made with a prescribed amount of the liquid active, and then the pouch is weighed over time to determine the transmission of vaporized liquid.

In certain embodiments, high transmission rate materials refer to materials that have a MVTR equal or higher than 20 $g/m^2/day$ at approximately room temperature, and/or an OTR equal or higher than 5000 $cc/m^2/day$ at approximately room temperature.

With reference again to FIG. 1A, active agent 106 is distributed at the interface of the blown film. The blown film depicted in FIG. 1A is an example of blown film obtained shortly after it is manufactured. However, it should be understood that over time, the active agent may gradually permeate through the transmission layers. In other words, over time, the active agent may be found dispersed within the transmission layers. Thus, in other aspects, provided is a film, comprising two self-adhered transmission layers, wherein at least one active agent is distributed within the self-adhered transmission layers.

In certain embodiments, high transmission rate materials may include unbranched or short-branched polyethylene, linear low-density polyethylene (LLDPE), thermoplastic elastomer (TPE), ethylene vinyl acetate copolymer, mineral filled (e.g. calcium carbonate, talc) polymers that are intended in the manufacture of films, or polypropylenes intended for porous film (e.g. containing beta nucleators).

In some exemplary variations, the two transmission layers are made up of the same material. In such an exemplary variation, the two transmission layers originate from the two opposite sides of one collapsed blown film bubble and are therefore made up of the same material of the blown film bubble.

With reference again to FIG. 1A, interface 108 is depicted. As used herein, the interface is a result of entanglement of the polymer chains as the two surfaces of the same material self-adheres, the degree of which depends on the temperature and pressure being applied to the self-adhering surfaces. The more entanglement of the polymer chains, the more homogeneous the interface becomes, and the more invisible the interface is. Accordingly, in some variations of the blown film, an interface may be visible. Yet, in other variations of the blown film, no interface is visible. In some variations, the interface between the two self-adhered transmission layers is homogeneous. Yet, in other variations, the interface between the two self-adhered transmission layers is not homogeneous.

With reference again to FIG. 1A, active agent 106 is depicted. It should be understood that although only one active agent is depicted in FIG. 1A, in other exemplary embodiments, the blown film may incorporate two or more active agents. In some variations, the active agents are volatile agents. In some variations, the active agents are anti-microbial agents. Suitable anti-microbial agents may include, for example, ethyl pyruvate, 1-butanol, 3-methyl-, acetate, diallyl thiosulfinate, cinnamaldehyde, citral, thymol, menthol, eugenol, and/or carvacrol. Other active agents may include insecticide, acaricide, fungicide, plant growth regulator, and/or insect behavior modifier.

As noted above, the active agent is distributed at interface 108. In some variation, the active agent may be distributed uniformly. However, in other variations, the active agent may not be uniformly distributed at the interface. There may be certain areas at the interface which have active agent, and other areas that do not have active agent.

Distribution of the active agent in the blown film can be analyzed by comparing the concentrations (e.g. $g/m^2$) of the active agent at two points of the material along the interface. In some variations, uniform distribution of the active agent refers to the difference of the concentrations of the active agent at two points of the material along the interface being smaller than 0.1%, smaller than 0.2%, smaller than 0.3%, smaller than 0.4%, smaller than 0.5%, smaller than 0.6%, smaller than 0.7%, smaller than 0.8%, smaller than 0.9%, smaller than 1%, smaller than 2%, smaller than 3%, smaller than 4%, smaller than 5%, smaller than 6%, smaller than 7%, smaller than 8%, smaller than 9%, or smaller than 10%.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises: an interior barrier layer adjacent to the interior transmission layer; and an exterior barrier layer adjacent to the exterior transmission layer. In certain variations of the foregoing, the interior transmission layer and the interior barrier layer are ablated.

Various types of polymers are used to produce films having different properties. By combining a plurality of layers of different polymers into a multilayer film, one can improve the mechanical and physical properties of the film including puncture, tear and heat resistance, as well as moisture and oxygen barrier properties. Multilayer blown films may be manufactured by methods known in the art, see, for example, U.S. Patent Application No. 20140205847.

Figure 3A:
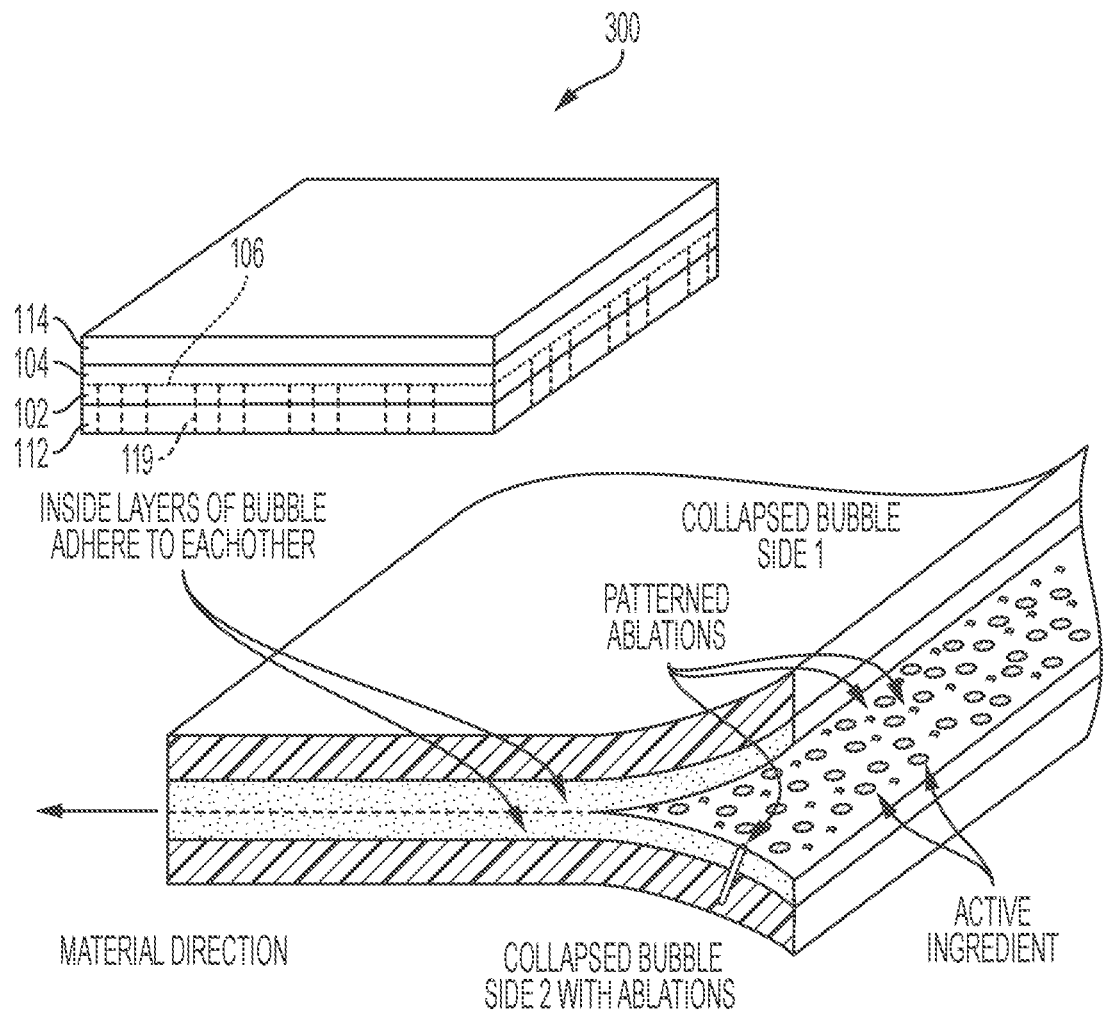
FIG. 3A and FIG. 3B show another exemplary film with two self-adhered transmission layers encapsulating at least one active agent, as well as additional barrier layers.
Figure 3B:
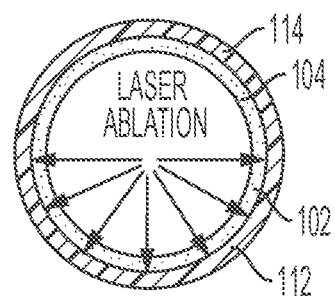

With reference to FIG. 3A, blown film 300 is made up of interior transmission layer 102, interior barrier layer 112, exterior transmission layer 104, and exterior barrier layer 114. With reference again to FIG. 3A, patterned ablations 119 are depicted.

A "barrier layer" refers to a layer made up of polymer displaying the ability to restrict the passage of gases, vapors, and organic liquids. In some embodiments, the barrier layers are made up of low transmission rate materials. In certain embodiments, low transmission rate materials refer to materials that have a MVTR equal or lower than 1 $g/m^2/day$, and/or an OTR equal or lower than 100 $cc/m^2/day$ and preferably lower than 10 $cc/m^2/day$.

In some variations, the barrier layers may include ethyl vinyl alcohol (EVOH), polyvinylidene chloride (PVDC), cyclic olefin copolymer (COC), or polymer with high aspect ratio clay.

As used herein, the term "interior" refers to the direction at which the blown film is used to surround or contain an article. As used herein, the term "exterior" refers to the direction away from which the blown film is used to surround or contain an article.

In some exemplary variations, the exterior barrier layer and the interior barrier layer are made up of the same material. In such an exemplary variation, the two barrier layers originate from the two opposite sides of one barrier layer of one collapsed blown film bubble and are therefore made up of the same material of the barrier layer of the blown film bubble. In some exemplary variations, the exterior transmission layer and the interior transmission layer are made up of the same material. In such an exemplary variation, the two transmission layers originate from the two opposite sides of one transmission layer of one collapsed blown film bubble and are therefore made up of the same material of the transmission layer of the blown film bubble.

In the present disclosure, ablation is used to provide openings or cuts in one or more layers of the blown film to allow or enhance passage of the at least one active agent. Various types of ablation in the art may be used, including chemical ablation, physical ablation (e.g. mechanical hole-punch), flame ablation, and laser ablation. A preferred ablation is laser ablation, which refers to the process of removing material from a solid surface by irradiating it with a laser beam. Examples of laser ablation include laser scoring, laser cutting, and laser micro-perforation.

In some embodiments, the blown films described herein are at least a portion of a package, where the interior layer will be closest to the food or article to be treated. For the purpose of releasing active agents into the sphere of the package, it is desirable to ablate the interior layers of the blown film. For instance, with reference again to FIG. 3A, the interior transmission layer 102 and the interior barrier layer 112 are ablated.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises: an interior barrier layer adjacent to the interior transmission layer; an interior sealant layer adjacent to the interior barrier layer; an exterior barrier layer adjacent to the exterior transmission layer; and an exterior sealant layer adjacent to the exterior barrier layer. In certain variations of the foregoing, the interior transmission layer and the interior barrier layer are ablated. In certain variations of the foregoing, the interior layers surround or contain a food product.

With reference to FIG. 1B and FIG. 4A, provided is yet another exemplary blown film. Blown film 110 is made up of interior transmission layer 102, interior barrier layer 112, interior sealant layer 116, exterior transmission layer 104, exterior barrier layer 114, and exterior sealant layer 118. With reference again to FIG. 1B and FIG. 4A, patterned ablations 119 are also depicted. As used herein, the term "sealant layer" refers to a layer of thermoplastic film that is capable of being attached to a second and/or third layer of film. When a sealant layer is used, the resulting package may have a leak proof seal. In some embodiments, the sealant layers are made up of low transmission rate materials. In some variations, the sealant layers may include low density polyethylene (LDPE), linear low-density polyethylene (LLDPE), thermoplastic elastomer (TPE), or metallocene polyethylene (mLLDPE). In some variations, the interior and exterior sealant layers are made up of the same material.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises: a first interior tie layer adjacent to the interior transmission layer; an interior barrier layer adjacent to the first interior tie layer; a second interior tie layer adjacent to the interior barrier layer; an interior sealant layer adjacent to the second interior tie layer; a first exterior tie layer adjacent to the exterior transmission layer; an exterior barrier layer adjacent to the first exterior tie layer; a second exterior tie layer adjacent to the exterior barrier layer; and an exterior sealant layer adjacent to the second exterior tie layer. In certain variations of the foregoing, at least the interior transmission layer, the first interior tie layer, and the interior barrier layer are ablated.

With reference to FIG. 1C, provided is yet another exemplary blown film. Blown film 120 is made up of interior transmission layer 102, first interior tie layer 122, interior barrier layer 112, second interior tie layer 126, interior sealant layer 116, exterior transmission layer 104, first exterior tie layer 124, exterior barrier layer 114, second exterior tie layer 128, and exterior sealant layer 118. With reference again to FIG. 1C, interface 108 and patterned ablations 119 are depicted. As used herein, the term "tie layer" refers to any internal film layer having the primary purpose of adhering two layers to one another. In some variations, the tie layers may comprise any nonpolar polymer having a polar group grafted thereon, so that the polymer is capable of covalent bonding to polar polymers, such as polyamide and ethylene/vinyl alcohol copolymer. In some variations, the tie layers may include ethylene-grafted-maleic anhydride, anhydride modified grafted linear low density polyethylene, anhydride grafted low density polyethylene, homogeneous ethylene % alpha-olefin copolymer, anhydride grafted ethylene/methyl acrylate copolymer, and/or anhydride grafted ethylene/vinyl acetate copolymer. In some variations, the interior and exterior sealant layers are made up of the same material. In some variations of the foregoing, the first interior tie layer and the first exterior tie layer are made up of the same material. In some variations, the second interior tie layer and the second exterior tie layer are made up of the same material.

With reference to FIG. 1D, provided is yet another exemplary blown film. Blown film 130 is made up of interior transmission layer 102, first interior tie layer 122, interior barrier layer 112, second interior tie layer 126, interior sealant layer 116, exterior transmission layer 104, first exterior tie layer 124, exterior barrier layer 114, second exterior tie layer 128, and exterior sealant layer 118. With reference again to FIG. 1D, patterned ablations 119 are depicted. Unlike FIG. 1C, no interface is visible in FIG. 1D.

With reference to FIG. 5A, provided is yet another exemplary blown film. Blown film 500 is made up of interior transmission layer 102, first interior tie layer 122, interior barrier layer 112, second interior tie layer 126, interior sealant layer 116, exterior transmission layer 104, first exterior tie layer 124, exterior barrier layer 114, second exterior tie layer 128, and exterior sealant layer 118. With reference again to FIG. 5A, patterned ablations 119 are depicted.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises a tie layer and an additional transmission layer having a lower transmission rate than the two self-adhered transmission layers, adjacent to the exterior transmission layer.

In certain embodiments, the additional transmission layer having a lower transmission rate than the two self-adhered transmission layers is cyclic olefin, or a blend thereof with polyethylene, which is a poor oxygen barrier but a desirable barrier to volatile active ingredient (aroma).

With reference to FIG. 1E, provided is yet another exemplary blown film. Blown film 140 is made up of interior transmission layer 102, exterior transmission layer 104, additional transmission layer 142 having a lower transmission rate than the two self-adhered transmission layers 102 and 104. In some embodiments, the thickness of the interior transmission layer 102 is equivalent to the sum of the thicknesses of the exterior transmission layer 104 and the additional transmission layer 142. In some variations, depending on the choice of the additional transmission layer 142, an additional tie layer may be desirable in between the exterior transmission layer 104 and the additional transmission layer 142.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises: a first tie layer adjacent to the exterior transmission layer; a barrier layer adjacent to the first tie layer; a second tie layer adjacent to the barrier layer; and a sealant layer adjacent to the second tie layer.

With reference to FIG. 6A, provided is yet another exemplary blown film. Blown film 600 is made up of interior transmission layer 102, exterior transmission layer 104, first tie layer 124, barrier layer 114, second tie layer 128, and sealant layer 118.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the blown film further comprises a lower transmission coating deposited on the exterior transmission layer.

As used herein, the term "coating" refers to a separate and distinct layer of material from an underlying material. A coated material exhibits an identifiable boundary, e.g., diffuse or abrupt, between the coating material and the underlying material, e.g., support material, underlying coating, etc. In some variations of the foregoing, the lower transmission coating is an inorganic coating. In some variations, the inorganic coating comprises aluminum, aluminum oxide, or silicon oxide, or any combinations thereof. In some variations of the foregoing, the lower transmission coating is an organic coating. In some variations, the organic coating comprises polyvinylidene chloride (PVDC), polyvinyl alcohol (PVOH), nanoclay, or any combinations thereof.

With reference to FIG. 1F, provided is yet another exemplary blown film. Blown film 150 is made up of interior transmission layer 102, exterior transmission layer 104, and lower transmission coating 152. In some embodiments, the thickness of the interior transmission layer 102 is equivalent to the thickness of the exterior transmission layer 104.

With reference to FIG. 1G, provided is yet another exemplary blown film. Blown film 160 is made up of interior transmission layer 102, exterior transmission layer 104, and organic coating 162.

With reference to FIG. 7A, provided is yet another exemplary blown film. Blown film 700 is made up of interior transmission layer 102, exterior transmission layer 104, and coating 702.

In other embodiments, the blown film includes one or more additional layers. In other embodiments, provided is a blown film comprising: two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, wherein each of two self-adhered transmission layers comprises an inner transmission sublayer and an outer transmission sublayer, and wherein the inner transmission sublayers have a lower melting point than the outer transmission sublayers, and wherein the inner transmission sublayers form the interface of the two self-adhered transmission layers and encapsulate the at least one active agent.

In certain embodiments, transmission layers comprising inner transmission sublayers that have lower melting point are more conducive to self-adhesion. In some variations, the inner transmission sublayer having lower melting point is metallocene polyethylene (m-PE).

With reference to FIG. 1H, provided is yet another exemplary blown film. Blown film 170 is made up of interior transmission layer 102 which comprises interior inner transmission sublayer 172 and interior outer transmission sublayer 176, and exterior inner transmission sublayer 104 which comprises exterior inner transmission sublayer 174 and exterior outer transmission layer 178. In some embodiments, the exterior inner transmission sublayer 174 and the exterior outer transmission layer 178 self-adhere.

Blown Film Manufacturing Methods

The films described herein are manufactured by a blown film extrusion process. Blown film extrusion is one of most commonly used methods of producing commodity packaging, for reasons such as flexibility to produce films with multiple thicknesses and widths from one process, biaxial orientation that results in good seal-ability into pouches, elimination of edge effects that require trimming, and low capital cost. Typically, a polymer resin is processed through an extruder to reach its melting point and to blend in various additives. The extruder serves as a conveyor, a blender and a pump. Once the polymer exits the extruder on its way to the tubular spiral die, it can exhibit pressures up to several thousand pounds per square inch (psi). The die forms a tube using the molten polymer of predetermined dimensions which is then inflated further using air and pulled upon by a haul off nip. The haul off nip pinches the tube to create a closed chamber which is the reason the tube can be inflated. The haul off nip also provides a velocity gradient which pulls the tube in the direction away from the die lip and draws the melt into a thin film.

There are generally two physical orientations of a blown film line. In one variation, the extruder and die are positioned on the floor, and the haul off nip on the ceiling. In another variation, the extruder and die are positioned on the ceiling, and the haul off nip on the floor. In the downward orientation, the nozzle is aided by gravity to distribute the active ingredient. In the upwards orientation, the spray has to be distributed and adhered to the moving film.

One key difference differentiating blown film extrusion from other film extrusion methods is that a spiral tubular die allows access through the center of the die. This access is normally used for cooling and inflation of the film tube using an internal bubble cooling device (IBC). The IBC forces large volumes of chilled air into the film tube (bubble) which normally starts at 200 degrees Celsius and simultaneously draws in large volumes of heated air. In some variations, the molten polymer exits the die at, for example, 200 degrees Celsius, where the IBC inlet cools it with chilled air. The air heats up as it cools the polymer melt, and is drawn out by the IBC exhaust.

The incoming air is balanced against the outgoing air using a control system and a tube diameter sensor with an objective to keep the diameter of the tube at a predetermined level. At the top of the die rests an air ring that impinges cool air onto the tube so as to cool it from the outside. The combined effort of these two cooling systems is used to cool the film below its melting point as soon as possible. The tube diameter, the volumetric flow rate of the molten polymer and the take up speed of the tube determines the ultimate film thickness. The film diameter can only be adjusted prior to the frost line which is a physical point along the length of the tube within a few feet from the tubular die where the molten film solidifies. In the present disclosure, however, generally, no IBC is used in the process of manufacturing the blown films. In the place of the IBC, a liquid dispersion device (LDD) that atomizes an active ingredient (e.g. ethyl pyruvate) is positioned within the interior of the film bubble. Generally, a blown film bubble collapses, causing two sides of the film bubble to self-adhere and encapsulate the active ingredient.

In some aspects, provided is a method for manufacturing a blown film, comprising:

providing a molten transmission polymer;

extruding the molten transmission polymer through an annular die to form an extruded melt;

injecting an inert gas through a hole in the center of the annular die to cause the extruded melt to expand into a bubble;

pulling the bubble continuously from the annular die;

dispensing at least one active agent in the interior of the bubble using an atomizer; and collapsing the bubble by pulling the bubble between a pair of nip rollers, wherein the bubble self-adheres to form the blown film, and wherein the blown film comprises two self-adhered transmission layers encapsulating at least one active agent, wherein the at least one active agent is distributed at the interface between the two self-adhered transmission layers.

Figure 2A:
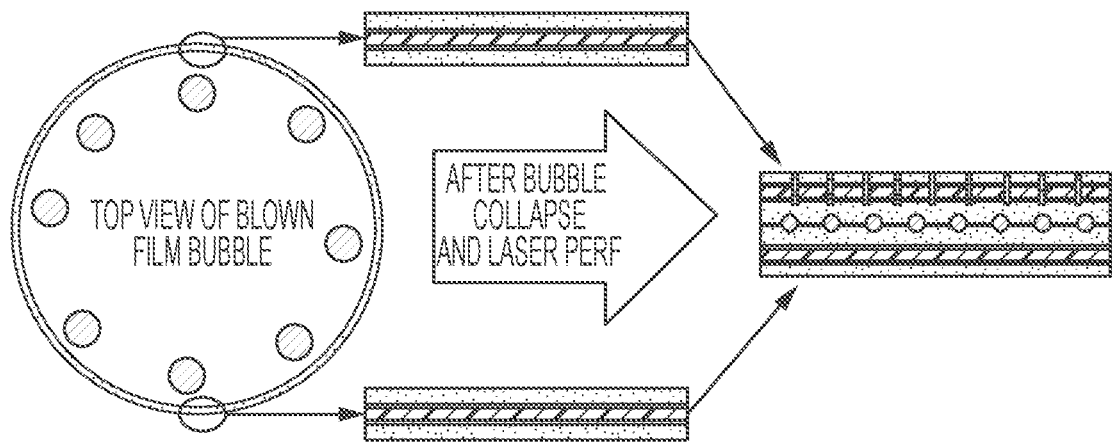
FIG. 2E illustrates an exemplary process for either inorganic or organic coating.
Figure 2B:
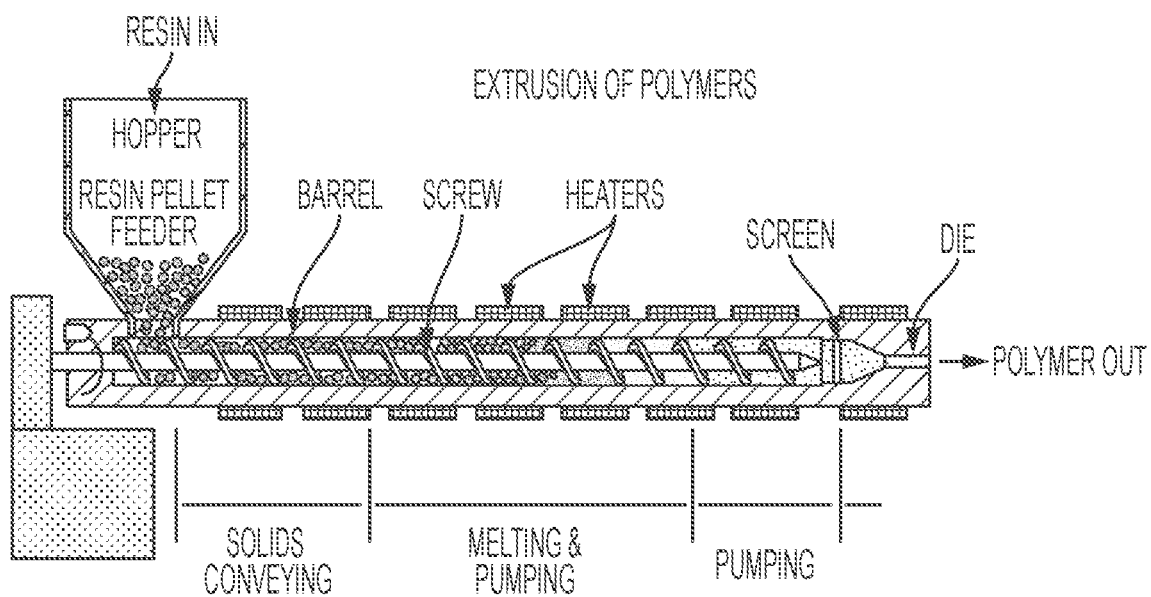
Figure 2C:
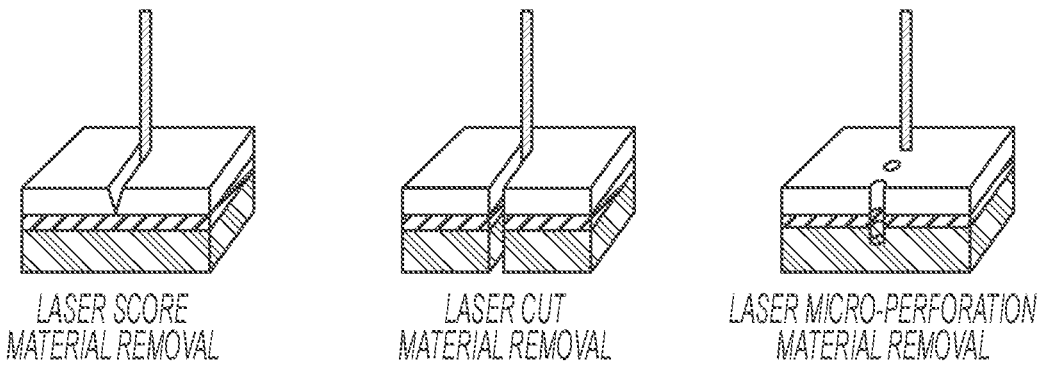
Figure 2D:
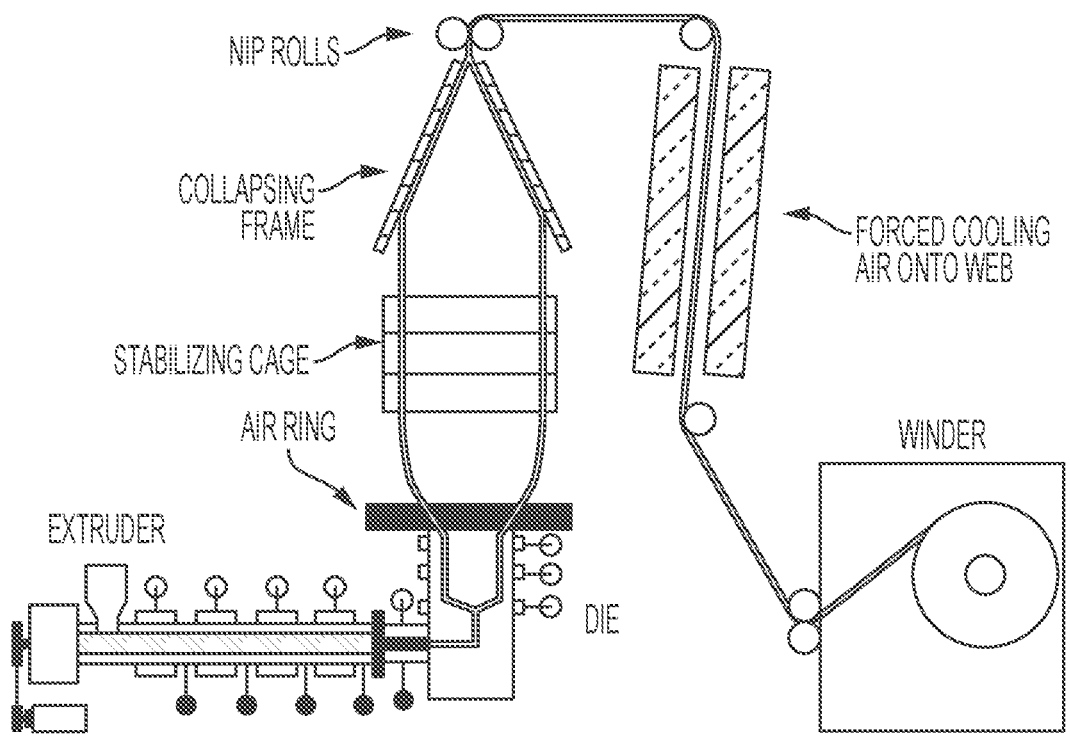
Figure 2E:
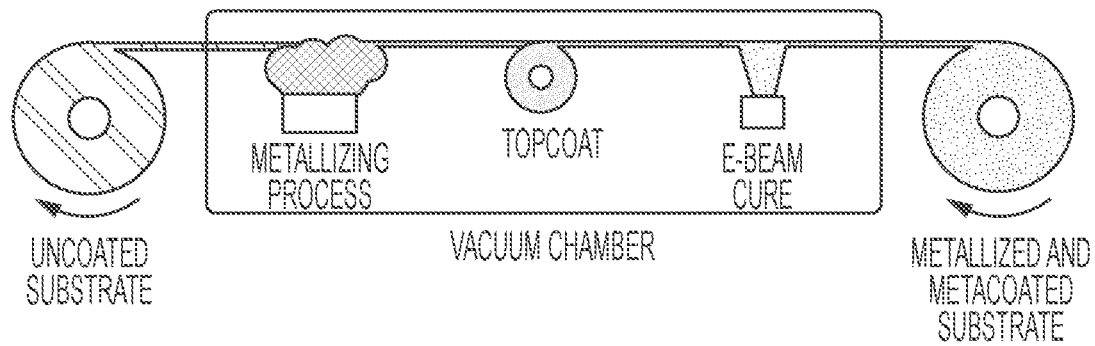

With reference to FIG. 8, an exemplary method 800 to manufacture the blown film is provided. In step 810, a molten transmission polymer is provided. The transmission polymer may be any of the high transmission rate materials described above. In step 812, the molten transmission polymer is extruded through an annular die to form an extruded melt. The polymer can be made into molten form and extruded by an extruder as depicted in FIG. 2B. In step 814, the inert gas is injected through a hole in the center of the annular die to cause the extruded melt to expand into a bubble, as depicted in FIG. 2D. The inert gas may be nitrogen, carbon dioxide, or helium, or any combinations thereof. In step 816, the bubble is pulled continuously upwards from the annular die, as depicted in FIG. 2D. In step 818, the active agent is dispensed in the interior of the bubble using an atomizer, as depicted in FIG. 2A. In step 820, the bubble is collapsed as it is pulled between a pair of nip rollers, as depicted in FIG. 2D. In step 822, the blown film is formed as the collapsed bubble self-adheres and encapsulates the active agent, as depicted in FIG. 2A.

In some variations of the foregoing, the bubble self-adheres by: (i) applying pressure at the haul-off nip sufficient to entangle the polymeric chains on the inner surface of the bubble; or (ii) maintaining the inner temperature of the bubble above the Vicat Softening Point of the transmission layer and below the boiling point of the active ingredient; or (iii) increasing the nip speed, or any combinations of (i)-(iii).

In some variations of the foregoing, the method for manufacturing a blown film includes one or more additional steps. In some embodiments, the method further includes blending a transmission polymer with at least one additive to form resin pellets. In some embodiments, the method further includes feeding the resin pellets into an extruder. In some embodiments, the method further includes melting the resin pellets to provide the molten transmission polymer. In some embodiments, the one or more additional steps are performed before step 810 with reference to FIG. 8.

One type of additives is slip additives which are used to reduce the coefficient of friction (COF) of the blown film, useful in processing the film to make pouches and during the packaging operation. Representative slip additives are erucamide and oleamide. Another type of additives is known as anti-block additives which are used to reduce the adhesion of layers of PE film at the winder. The effectiveness of these additives is temperature dependent. Since self-adhesion of the collapsed bubble happens at higher temperature at the haul off nip, these additives will have limited interference with the self-adhesion of the collapsed bubble. These additives are useful when the blown films are wound on rolls, when (especially with post extrusion film cooling) the temperature is low enough not to cause adhesion (known as blocking in the art). The anti-block additives usually contain blends of: natural silica, talc, calcium carbonate, clay, and mica. Slip additives act as anti-blocks include bis-amide (e.g. ethylene bisstearamide (EBS)), secondary amide (e.g. stearyl erucamide), primary amide (e.g. stearamide, erucamide), organic stearate (e.g. glycerol monostearate (GMS)), metallic stearate (zinc stearate), silicone, and polytetrafluoroethylene (PTFE). In certain embodiments, the additives provide a coefficient of friction in the range of 0.05-0.8. In certain embodiments, the additives are blended at a concentration of 200 to 1000 ppm in the extruded melt.

In other embodiments, the method for manufacturing a blown film includes one or more additional steps. In other embodiments, provided is a method for manufacturing a blown film comprising:
- combining a molten transmission polymer, a molten barrier polymer, and a molten sealant polymer in a feedblock;
- co-extruding the molten transmission polymer, the molten barrier polymer, and the molten sealant polymer from the feedblock through an annular die to form a multi-layered extruded melt, wherein:
  - the molten transmission polymer is extruded as a transmission layer on the inside of the multi-layered extruded melt,
  - the molten sealant polymer is extruded as a sealant layer on the outside of the multi-layered extruded melt, and
  - the molten barrier polymer is extruded as a barrier layer in between the transmission layer and the sealant layer of the multi-layered extruded melt;
- injecting an inert gas through a hole in the center of the annular die to cause the multi-layered extruded melt to expand into a bubble,
- pulling the bubble continuously from the annular die;
- dispensing at least one active agent in the interior of the bubble using an atomizer;
- ablating one side of the interior of the bubble using a laser; and
- collapsing the ablated bubble by pulling the bubble between a pair of nip rollers, wherein the bubble self-adheres to form a blown film,
- wherein the blown film comprises two self-adhered transmission layers encapsulating at least one active agent, wherein the at least one active agent is distributed at the interface between the two self-adhered transmission layers,
- wherein one of the two self-adhered transmission layers is an interior transmission layer and the other is an exterior transmission layer, and
- wherein the blown film further comprises:
  - an interior barrier layer adjacent to the interior transmission layer;
  - an interior sealant layer adjacent to the interior barrier layer;
  - an exterior barrier layer adjacent to the exterior transmission layer;
  - an exterior sealant layer adjacent to the exterior barrier layer, and wherein the interior transmission layer, the interior barrier layer, and the interior sealant layer are ablated.

With reference to FIG. 9, an exemplary method 900 to manufacture the blown film is provided. In step 910, a molten transmission polymer, a molten barrier polymer, and a molten sealant polymer are combined in a feedblock. In step 912, the molten transmission polymer, the molten barrier polymer, and the molten sealant polymer are co-extruded through an annular die to form a multi-layered extruded melt, wherein the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt. In step 914, the inert gas is injected through a hole in the center of the annular die to cause the extruded melt to expand into a bubble, as depicted in FIG. 2D. In step 916, the bubble is pulled continuously from the annular die, as depicted in FIG. 2D. In some embodiments, the laser ablator is located inside the bubble. In step 918, the active agent is dispensed in the interior of the bubble using an atomizer, as depicted in FIG. 2A. In step 920, one side of the interior of the bubble is laser ablated, as depicted in FIG. 2C and FIG. 4B. In step 922, the bubble is collapsed as it is pulled between a pair of nip rollers, as depicted in FIG. 2D. In step 924, the blown film is formed as the collapsed bubble self-adheres and encapsulates the active agent, as depicted in FIG. 2A.

In some other embodiments, provided is a method for manufacturing a blown film comprising:

- combining a molten transmission polymer, a molten barrier polymer, and a molten sealant polymer in a feedblock;
- co-extruding the molten transmission polymer, the molten barrier polymer, and the molten sealant polymer from the feedblock through an annular die to form a multi-layered extruded melt, wherein:
  - the molten transmission polymer is extruded as a transmission layer on the inside of the multi-layered extruded melt,
  - the molten sealant polymer is extruded as a sealant layer on the outside of the multi-layered extruded melt, and
  - the molten barrier polymer is extruded as a barrier layer in between the transmission layer and the sealant layer of the multi-layered extruded melt;
- injecting an inert gas through a hole in the center of the annular die to cause the multi-layered extruded melt to expand into a bubble,
- pulling the bubble continuously from the annular die;
- dispensing at least one active agent in the interior of the bubble using an atomizer;
- collapsing the bubble by pulling the bubble between a pair of nip rollers, wherein the bubble self-adheres to form a blown film; and
- ablating one side of the blown film using a laser,
- wherein the blown film comprises two self-adhered transmission layers encapsulating at least one active agent, wherein the at least one active agent is distributed at the interface between the two self-adhered transmission layers,
- wherein one of the two self-adhered transmission layers is an interior transmission layer and the other is an exterior transmission layer, and
- wherein the blown film further comprises:
  - an interior barrier layer adjacent to the interior transmission layer;
  - an interior sealant layer adjacent to the interior barrier layer;
  - an exterior barrier layer adjacent to the exterior transmission layer;

an exterior sealant layer adjacent to the exterior barrier layer, and wherein the interior transmission layer, the interior barrier layer, and the interior sealant layer are ablated.

With reference to FIG. 10, an exemplary method 1000 to manufacture the blown film is provided. In step 1010, a molten transmission polymer, a molten barrier polymer, and a molten sealant polymer are combined in a feedblock. In step 1012, the molten transmission polymer, the molten barrier polymer, and the molten sealant polymer are co-extruded through an annular die to form a multi-layered extruded melt, wherein the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt. In step 1014, the inert gas is injected through a hole in the center of the annular die to cause the extruded melt to expand into a bubble, as depicted in FIG. 2D. In step 1016, the bubble is pulled continuously upwards from the annular die, as depicted in FIG. 2D. In step 1018, the active agent is dispensed in the interior of the bubble using an atomizer, as depicted in FIG. 2A. In step 1020, the bubble is collapsed as it is pulled between a pair of nip rollers, as depicted in FIG. 2D. In step 1022, the blown film is formed as the collapsed bubble self-adheres and encapsulates the active agent, as depicted in FIG. 2A. In step 1026, one side of the blown film is ablated, as depicted in FIG. 2C and FIG. 4C.

In some variations of the foregoing, the method for manufacturing a blown film includes one or more additional steps. In some embodiments, the method further includes:
  a) blending a transmission polymer with at least one additive to form first resin pellets; feeding the first resin pellets into a first extruder; and melting the resin pellets to provide the molten transmission polymer;
  b) blending a barrier polymer with at least one additive to form second resin pellets; feeding the second resin pellets into a second extruder; and melting the second resin pellets to provide the molten barrier polymer; and
  c) blending a sealant polymer with at least one additive to form third resin pellets; feeding the third resin pellets into a third extruder;
melting the third resin pellets to provide the molten sealant polymer. In some embodiments, the one or more additional steps are performed before step 910 with reference to FIG. 9 or step 1010 with reference to FIG. 10.

In still some other embodiments, provided is a method for manufacturing a blown film comprising:
  combining a molten transmission polymer, a first molten tie polymer, a molten barrier polymer, a second molten tie polymer, and a molten sealant polymer in a feedblock;
  co-extruding the molten transmission polymer, the first molten tie polymer, the molten barrier polymer, the second molten tie polymer, and the molten sealant polymer from the feedblock through an annular die to form a multi-layered extruded melt, wherein:
    the molten transmission polymer is extruded as a transmission layer on the inside of the multi-layered extruded melt,
    the molten sealant polymer is extruded as a sealant layer on the outside of the multi-layered extruded melt,
    the molten barrier polymer is extruded as a barrier layer in between the transmission layer and the sealant layer of the multi-layered extruded melt,
    the first molten tie polymer is extruded as a first tie layer in between the transmission layer and the barrier layer, and
    the second molten tie polymer is extruded as a second time layer in between the barrier layer and the sealant layer;
  injecting an inert gas through a hole in the center of the annular die to cause the multi-layered extruded melt to expand into a bubble,
  pulling the bubble continuously from the annular die;
  dispensing at least one active agent in the interior of the bubble using an atomizer;
  ablating one side of the interior of the bubble using a laser; and
  collapsing the ablated bubble by pulling the bubble between a pair of nip rollers, wherein the bubble self-adheres to form a blown film,
  wherein the blown film comprises two self-adhered transmission layers encapsulating at least one active agent, wherein the at least one active agent is distributed at the interface between the two self-adhered transmission layers,
  wherein one of the two self-adhered transmission layers is an interior transmission layer and the other is an exterior transmission layer, and
  wherein the blown film further comprises:
    a first interior tie layer adjacent to the interior transmission layer;
    an interior barrier layer adjacent to the first interior tie layer;
    a second interior tie layer adjacent to the interior barrier layer;
    an interior sealant layer adjacent to the second interior tie layer;
    a first exterior tie layer adjacent to the exterior transmission layer;
    an exterior barrier layer adjacent to the first exterior tie layer;
    a second exterior tie layer adjacent to the exterior barrier layer;
    an exterior sealant layer adjacent to the second exterior tie layer;
    wherein the interior transmission layer, the first interior tie layer, the interior barrier layer, the second interior tie layer, and the interior sealant layer are ablated.

With reference to FIG. 11, an exemplary method 1100 to manufacture the blown film is provided. In step 1110, a molten transmission polymer, a molten barrier polymer, and a molten sealant polymer are combined in a feedblock. In step 1112, the molten transmission polymer, the first molten tie polymer, the molten barrier polymer, the second molten tie polymer, and the molten sealant polymer are co-extruded through an annular die to form a multi-layered extruded melt, wherein the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt. In step 1114, the inert gas is injected through a hole in the center of the annular die to cause the extruded melt to expand into a bubble, as depicted in FIG. 2D. In some embodiments, the laser ablator is located inside the bubble. In step 1116, the bubble is pulled continuously upwards from the annular die, as depicted in FIG. 2D. In step 1118, the active agent is dispensed in the interior of the bubble using an atomizer, as depicted in FIG. 2A. In step 1120, one side of the interior of the bubble is laser ablated, as depicted in FIG. 2C and FIG. 5C. In step 1122, the bubble is collapsed as it is pulled between a pair of nip rollers, as depicted in FIG. 2D. In step 1124, the blown film is formed as the collapsed bubble self-adheres and encapsulates the active agent, as depicted in FIG. 2A.

In some other embodiments, provided is a method for manufacturing a blown film comprising:
  combining a molten transmission polymer, a molten barrier polymer, and a molten sealant polymer in a feedblock;
  co-extruding the molten transmission polymer, the molten barrier polymer, and the molten sealant polymer from the feedblock through an annular die to form a multi-layered extruded melt, wherein:
    the molten transmission polymer is extruded as a transmission layer on the inside of the multi-layered extruded melt,
    the molten sealant polymer is extruded as a sealant layer on the outside of the multi-layered extruded melt, and
    the molten barrier polymer is extruded as a barrier layer in between the transmission layer and the sealant layer of the multi-layered extruded melt;
  injecting an inert gas through a hole in the center of the annular die to cause the multi-layered extruded melt to expand into a bubble,
  pulling the bubble continuously from the annular die;
  dispensing at least one active agent in the interior of the bubble using an atomizer;
  collapsing the bubble by pulling the bubble between a pair of nip rollers, wherein the bubble self-adheres to form a blown film; and
  ablating one side of the blown film using a laser,
  wherein the blown film comprises two self-adhered transmission layers encapsulating at least one active agent, wherein the at least one active agent is distributed at the interface between the two self-adhered transmission layers,
- wherein one of the two self-adhered transmission layers is an interior transmission layer and the other is an exterior transmission layer, and
- wherein the blown film further comprises:
  - an interior barrier layer adjacent to the interior transmission layer;
  - an interior sealant layer adjacent to the interior barrier layer;
  - an exterior barrier layer adjacent to the exterior transmission layer;
  - an exterior sealant layer adjacent to the exterior barrier layer, and wherein the interior transmission layer, the interior barrier layer, and the interior sealant layer are ablated.

With reference to FIG. 12, an exemplary method 1200 to manufacture the blown film is provided. In step 1210, a molten transmission polymer, a molten barrier polymer, and a molten sealant polymer are combined in a feedblock. In step 1212, the molten barrier polymer, and the molten sealant polymer are co-extruded through an annular die to form a multi-layered extruded melt, wherein the molten transmission polymer is extruded as a transmission layer on the inside of the multi-layered extruded melt, the molten sealant polymer is extruded as a sealant layer on the outside of the multi-layered extruded melt, and the molten barrier polymer is extruded as a barrier layer in between the transmission layer and the sealant layer of the multi-layered extruded melt. In step 1214, the inert gas is injected through a hole in the center of the annular die to cause the extruded melt to expand into a bubble, as depicted in FIG. 2D. In step 1216, the bubble is pulled continuously upwards from the annular die, as depicted in FIG. 2D. In step 1218, the active agent is dispensed in the interior of the bubble using an atomizer, as depicted in FIG. 2A. In step 1220, the bubble is collapsed as it is pulled between a pair of nip rollers, as depicted in FIG. 2D. In step 1222, the blown film is formed as the collapsed bubble self-adheres and encapsulates the active agent, as depicted in FIG. 2A. In step 1224, one side of the blown film is ablated, as depicted in FIG. 2C and FIG. 5C.

In some variations of the foregoing, the method for manufacturing a blown film includes one or more additional steps. In some embodiments, the method further includes:

- a) blending a transmission polymer with at least one additive to form first resin pellets; feeding the first resin pellets into a first extruder; and melting the resin pellets to provide the molten transmission polymer;
- b) blending a barrier polymer with at least one additive to form second resin pellets; feeding the second resin pellets into a second extruder; and melting the second resin pellets to form the molten barrier polymer;
- c) blending a sealant polymer with at least one additive to form third resin pellets; feeding the third resin pellets into a third extruder; and melting the third resin pellets to form the molten sealant polymer;
- d) blending a first tie polymer with at least one additive to form fourth resin pellets; feeding the fourth resin pellets into a fourth extruder; and melting the fourth resin pellets to form the first molten tie polymer; and
- e) blending a second tie polymer with at least one additive to form fifth resin pellets; feeding the fifth resin pellets into a fifth extruder; and melting the fifth resin pellets to form the second molten tie polymer.

In some embodiments, the one or more additional steps are performed before step 1110 with reference to FIG. 11 or step 1210 with reference to FIG. 12.

In still some other embodiments, provided is a method for manufacturing a blown film comprising:

- combining a molten transmission polymer, a molten tie polymer, and an additional molten transmission polymer having a lower transmission rate;
- co-extruding the molten transmission polymer, the molten tie polymer, and the additional molten transmission polymer from the feedblock through an annular die to form a multi-layered extruded melt, wherein:
  - the molten transmission polymer is extruded as a transmission layer, and
  - the molten tie polymer and the additional molten transmission polymer having the lower transmission rate are extruded on one side of the annular die as a tie layer and an additional transmission layer;
- injecting an inert gas through a hole in the center of the annular die to cause the multi-layered extruded melt to expand into a bubble,
- pulling the bubble continuously from the annular die;
- dispensing at least one active agent in the interior of the bubble using an atomizer;
- collapsing the bubble by pulling the bubble between a pair of nip rollers, wherein the bubble self-adheres to form a blown film,
- wherein the blown film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the additional transmission layer having the lower transmission rate is adjacent to the tie layer, and the tie layer is adjacent to the exterior transmission layer.

With reference to FIG. 13, an exemplary method 1300 to manufacture the blown film is provided. In step 1310, a molten transmission polymer, a molten tie polymer, and an additional molten transmission polymer having a lower transmission rate are combined in a feedblock. In step 1312, the molten transmission polymer, the molten tie polymer, and the additional molten transmission polymer are co-extruded through an annular die to form a multi-layered extruded melt, wherein the molten transmission polymer is extruded as a transmission layer, and the molten tie polymer and the additional molten transmission polymer having the lower transmission rate are extruded on one side of the annular die as a tie layer and an additional transmission layer. In step 1314, the inert gas is injected through a hole in the center of the annular die to cause the extruded melt to expand into a bubble, as depicted in FIG. 2D. In step 1316, the bubble is pulled continuously upwards from the annular die, as depicted in FIG. 2D. In step 1318, the active agent is dispensed in the interior of the bubble using an atomizer, as depicted in FIG. 2A. In step 1320, the bubble is collapsed as it is pulled between a pair of nip rollers, as depicted in FIG. 2D. In step 1322, the blown film is formed as the collapsed bubble self-adheres and encapsulates the active agent, as depicted in FIG. 2A.

In some variations of the foregoing, the method for manufacturing a blown film includes one or more additional steps. In some embodiments, the method further includes:

a) blending a transmission polymer with at least one additive to form first resin pellets; feeding the first resin pellets into a first extruder; and melting the resin pellets to provide the molten transmission polymer; and b) blending an additional transmission polymer having a lower transmission rate with at least one additive to form second resin pellets;

feeding the second resin pellets into a second extruder; and melting the second resin pellets to provide the additional molten transmission polymer.

In some embodiments, the one or more additional steps are performed before step 1310 with reference to FIG. 13.

In still some other embodiments, provided is a method for manufacturing a blown film comprising:

providing a molten transmission polymer;

extruding the molten transmission polymer through an annular die to form an extruded melt;

injecting an inert gas through a hole in the center of the annular die to cause the extruded melt to expand into a bubble;

pulling the bubble continuously from the annular die;

dispensing at least one active agent in the interior of the bubble using an atomizer;

collapsing the bubble by pulling the bubble between a pair of nip rollers, wherein the bubble self-adheres to form the blown film; and depositing a lower transmission coating on the exterior transmission layer.

With reference to FIG. 14, an exemplary method 1400 to manufacture the blown film is provided. In step 810, a molten transmission polymer is provided. In step 812, the molten transmission polymer is extruded through an annular die to form an extruded melt. The polymer can be made into molten form and extruded by an extruder as depicted in FIG. 2B. In step 814, the inert gas is injected through a hole in the center of the annular die to cause the extruded melt to expand into a bubble, as depicted in FIG. 2D. In step 816, the bubble is pulled continuously upwards from the annular die, as depicted in FIG. 2D. In step 818, the active agent is dispensed in the interior of the bubble using an atomizer, as depicted in FIG. 2A. In step 820, the bubble is collapsed as it is pulled between a pair of nip rollers, as depicted in FIG. 2D. In step 822, the blown film is formed as the collapsed bubble self-adheres and encapsulates the active agent, as depicted in FIG. 2A. In step 1402, the lower transmission coating is deposited on the exterior transmission layer, as depicted in FIG. 1F, FIG. 1G, and FIG. 2E.

In still some other embodiments, provided is a method for manufacturing a blown film comprising:

combining a molten transmission polymer and an additional molten transmission polymer having a lower melt point;

co-extruding the molten transmission polymer and the additional molten transmission polymer from the feedblock through an annular die to form a multi-layered extruded melt, wherein:

the molten transmission polymer is extruded as an outer transmission sublayer, and the additional molten transmission polymer having the lower melt point is extruded as an inner transmission sublayer;

injecting an inert gas through a hole in the center of the annular die to cause the multi-layered extruded melt to expand into a bubble, pulling the bubble continuously from the annular die;

dispensing at least one active agent in the interior of the bubble using an atomizer;

collapsing the bubble by pulling the bubble between a pair of nip rollers, wherein the bubble self-adheres to form a blown film, wherein the blown film comprises two self-adhered transmission layers, each comprising an inner transmission sublayer and an outer transmission sublayer, wherein the inner transmission sublayers have a lower melt point than the outer transmission sublayers, and wherein the inner transmission sublayers form the interface of the two self-adhered transmission layers and encapsulate the at least one active agent.

With reference to FIG. 15, an exemplary method 1500 to manufacture the blown film is provided. In step 1510, a molten transmission polymer and an additional molten transmission polymer having a lower melt point are combined in a feedblock. In step 1512, the molten transmission polymer and the additional molten transmission polymer are co-extruded through an annular die to form a multi-layered extruded melt, wherein the molten transmission polymer is extruded as an outer transmission sublayer, and the additional molten transmission polymer having the lower melt point is extruded as an inner transmission sublayer. In step 1514, the inert gas is injected through a hole in the center of the annular die to cause the extruded melt to expand into a bubble, as depicted in FIG. 2D. In step 1516, the bubble is pulled continuously upwards from the annular die, as depicted in FIG. 2D. In step 1518, the active agent is dispensed in the interior of the bubble using an atomizer, as depicted in FIG. 2A. In step 1520, the bubble is collapsed as it is pulled between a pair of nip rollers, as depicted in FIG. 2D. In step 1522, the blown film is formed as the collapsed bubble self-adheres and encapsulates the active agent, as depicted in FIG. 2A.

In some variations of the foregoing, the method for manufacturing a blown film includes one or more additional steps. In some embodiments, the method further includes the step of cooling the blown film. In some embodiments, the method further includes the step of winding the cooled blown film onto a roll. In some embodiments, the one or more additional steps are performed after step 822 with reference to FIG. 8, after step 924 with reference to FIG. 9, after step 1026 with reference to FIG. 10, after step 1124 with reference to FIG. 11, after step 1226 with reference to FIG. 12, after step 1322 with reference to FIG. 13, after step 822 but before step 1402 with reference to FIG. 14, or after step 1524 with reference to FIG. 15.

Blown Film Uses

The blown films described herein may be used as packaging materials for any suitable products. In certain embodiments, the blown film is used for packaging a perishable product such as a food, feed or agricultural product. Examples of food products include cheese, cream cheese, shredded cheese, cottage cheese, processed cheese, sour cream, dried fermented meat products, wine, beer, yoghurt, juice and other beverages, salad dressing, cottage cheese dressing, dips, bakery products and bakery fillings, surface glazes and icing, spreads, pizza toppings, confectionery and confectionery fillings, olives, olive brine, olive oil, juices, tomato purees and paste, condiments, and fruit pulp and the like food products. Examples of feed products include pet food, broiler feed, etc. Examples of agricultural products include cereals, fruits, vegetables, mushrooms, ornamental plants. In certain embodiments, the blown film is used for packaging an organ or a tissue.

Due to their differences in composition, the blown films of present disclosure may have different preferred uses. By way of example, the blown films as depicted in FIG. 1C, FIG. 1D, and FIG. 5A are well suited for use as packaging materials for cheese (in grated, ground, and/or block form), beef jerky, and raisins, as lid films for produce (such as tomatoes and strawberries). In contrast, the blown films as depicted in FIG. 1A and FIG. 3A are more suited as packaging films for bakery products (such as bread) and as agricultural films. When used as agricultural films, the brown films may contain an insecticide as the active agent. The blown films as depicted in FIG. 1E are suitable for use as packaging films for bakery products (such as bread) and cheese.

ENUMERATED EMBODIMENTS

The following enumerated embodiments are representative of some aspects of the invention.

1. A film comprising:
   two self-adhered transmission layers encapsulating at least one active agent, wherein the at least one active agent is distributed at the interface between the two self-adhered transmission layers.
2. The film of embodiment 1, wherein one of the two self-adhered transmission layers is an interior transmission layer and the other is an exterior transmission layer, and wherein the film further comprises:
   an interior barrier layer adjacent to the interior transmission layer; and
   an exterior barrier layer adjacent to the exterior transmission layer, wherein the interior transmission layer and the interior barrier layer are ablated.
3. The film of embodiment 2, wherein:
   the interior barrier layer and the exterior barrier layer are made up of the same material.
4. The film of embodiment 1, wherein one of the two self-adhered transmission layers is an interior transmission layer and the other is an exterior transmission layer, and wherein the film further comprises:
   an interior barrier layer adjacent to the interior transmission layer;
   an interior sealant layer adjacent to the interior barrier layer;
   an exterior barrier layer adjacent to the exterior transmission layer; and
   an exterior sealant layer adjacent to the exterior barrier layer,
wherein at least the interior transmission layer and the interior barrier layer are ablated.
5. The film of embodiment 4, wherein:
   the interior barrier layer and the exterior barrier layer are made up of the same material; and
   the interior sealant layer and the exterior sealant layer are made up of the same material.
6. The film of embodiment 1, wherein one of the two self-adhered transmission layers is an interior transmission layer and the other is an exterior transmission layer, and wherein the film further comprises:
   a first interior tie layer adjacent to the interior transmission layer;
   an interior barrier layer adjacent to the first interior tie layer;
   a second interior tie layer adjacent to the interior barrier layer;
   an interior sealant layer adjacent to the second interior tie layer;
   a first exterior tie layer adjacent to the exterior transmission layer;
   an exterior barrier layer adjacent to the first exterior tie layer;
   a second exterior tie layer adjacent to the exterior barrier layer; and
   an exterior sealant layer adjacent to the second exterior tie layer,
wherein at least the interior transmission layer, the first interior tie layer and the interior barrier layer are ablated.
7. The film of embodiment 6, wherein:
   the first interior tie layer and the first exterior tie layer are made up of the same material;
   the interior barrier layer and the exterior barrier layer are made up of the same material;
   the second interior tie layer and the second exterior tie layer are made up of the same material; and
   the interior sealant layer and the exterior sealant layer are made up of the same material.
8. The film of embodiment 1, wherein one of the two self-adhered transmission layers is an interior transmission layer and the other is an exterior transmission layer, and
wherein the film further comprises
a tie layer; and
an additional transmission layer having a lower transmission rate than the two self-adhered transmission layers, adjacent to the exterior transmission layer, adjacent to the exterior transmission layer.

9. The film of embodiment 1, wherein one of the two self-adhered transmission layers is an interior transmission layer and the other is an exterior transmission layer, and
  wherein the film further comprises:
    a first tie layer adjacent to the exterior transmission layer;
    a barrier layer adjacent to the first tie layer;
    a second tie layer adjacent to the barrier layer; and
    a sealant layer adjacent to the second tie layer.
10. The film of embodiment 1, wherein one of the two self-adhered transmission layers is an interior transmission layer and the other is an exterior transmission layer, and
  wherein the film further comprises a lower transmission coating deposited on the exterior transmission layer.
11. The film of embodiment 10, wherein the lower transmission coating is an organic coating.
12. The film of embodiment 11, wherein the organic coating comprises polyvinylidene chloride (PVDC), polyvinyl alcohol (PVOH), nanoclay, or any combinations thereof.
13. The film of embodiment 10, wherein the lower transmission coating is an inorganic coating.
14. The film of embodiment 13, wherein the inorganic coating comprises aluminum, aluminum oxide, silicon oxide, or any combinations thereof.
15. The film of any one of embodiments 1 to 14, wherein each of two self-adhered transmission layers comprises an inner transmission sublayer and an outer transmission sublayer,
  wherein the inner transmission sublayers have a lower melt point than the outer transmission sublayers, and
  wherein the inner transmission sublayers self-adhere to form the interface of the two self-adhered transmission layers and encapsulate the at least one active agent.
16. The film of any one of embodiments 1 to 15, wherein the interface between the two self-adhered transmission layers is homogeneous.
17. The film of any one of embodiments 1 to 16, wherein the at least one active agent is a volatile compound.
18. The film of any one of embodiments 1 to 17, wherein the at least one active agent is an anti-microbial agent.
19. The film of any one of embodiments 1 to 18, wherein the at least one active agent is selected from the group consisting of ethyl pyruvate, 1-butanol, 3-methyl-, acetate, diallyl thiosulfinate, cinnamaldehyde, citral, thymol, menthol, eugenol, and carvacrol.
20. The film of any one of embodiments 1 to 19, wherein each transmission layer comprises an unbranched or short-branched polyethylene.
21. The film of any one of embodiments 1 to 20, wherein each transmission layer comprises linear low-density polyethylene (LLDPE).
22. The film of any one of embodiments 1 to 21, wherein the tie layer comprises ethylene-grafted-maleic anhydride or anhydride modified polyethylene.
23. The film of any one of embodiments 1 to 22, wherein the barrier layer comprises polyvinyl alcohol (PVOH) or polyvinylidene chloride (PVDC).
24. The film of any one of embodiments 1 to 23, wherein the sealant layer comprises low density polyethylene (LDPE) or linear low-density polyethylene (LLDPE).
25. The film of any one of embodiments 1 to 24, wherein no additional adhesive material or layer is present at the interface between the two self-adhered transmission layers.
26. The film of any one of embodiments 1 to 25 for use as a packaging film.
27. A method for manufacturing a film, comprising:
  providing a molten transmission polymer;
  extruding the molten transmission polymer through an annular die to form an extruded melt;
  injecting an inert gas through a hole in the center of the annular die to cause the extruded melt to expand into a bubble;
  pulling the bubble continuously from the annular die;
  dispensing at least one active agent in the interior of the bubble using an atomizer; and
  collapsing the bubble by pulling the bubble between a pair of nip rollers, wherein the bubble self-adheres to form a film,
    wherein the film comprises two self-adhered transmission layers encapsulating at least one active agent, wherein the at least one active agent is distributed at the interface between the two self-adhered transmission layers.
28. The method of embodiment 27, further comprising:
  blending a transmission polymer with at least one additive to form resin pellets; feeding the resin pellets into an extruder; and
  melting the resin pellets to provide the molten transmission polymer.
29. A method for manufacturing a film, comprising:
  combining a molten transmission polymer, a molten barrier polymer, and a molten sealant polymer in a feedblock;
  co-extruding the molten transmission polymer, the molten barrier polymer, and the molten sealant polymer from the feedblock through an annular die to form a multi-layered extruded melt, wherein:
    the molten transmission polymer is extruded as a transmission layer on the inside of the multi-layered extruded melt,
    the molten sealant polymer is extruded as a sealant layer on the outside of the multi-layered extruded melt, and
    the molten barrier polymer is extruded as a barrier layer in between the transmission layer and the sealant layer of the multi-layered extruded melt;
  injecting an inert gas through a hole in the center of the annular die to cause the multi-layered extruded melt to expand into a bubble,
  pulling the bubble continuously from the annular die;
  dispensing at least one active agent in the interior of the bubble using an atomizer; ablating one side of the interior of the bubble using a laser; and
  collapsing the ablated bubble by pulling the bubble between a pair of nip rollers, wherein the bubble self-adheres to form a film,
  wherein the film comprises two self-adhered transmission layers encapsulating at least one active agent, wherein the at least one active agent is distributed at the interface between the two self-adhered transmission layers,
  wherein one of the two self-adhered transmission layers is an interior transmission layer and the other is an exterior transmission layer, and wherein the film further comprises:
an interior barrier layer adjacent to the interior transmission layer;
an interior sealant layer adjacent to the interior barrier layer;
an exterior barrier layer adjacent to the exterior transmission layer;
an exterior sealant layer adjacent to the exterior barrier layer, and
wherein the interior transmission layer, the interior barrier layer, and the interior sealant layer are ablated.

30. A method for manufacturing a film, comprising:
combining a molten transmission polymer, a molten barrier polymer, and a molten sealant polymer in a feedblock;
co-extruding the molten transmission polymer, the molten barrier polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt, and
the molten barrier polymer is extruded as a barrier layer in between the transmission layer and the sealant layer of the multi-layered extruded melt;
injecting an inert gas through a hole in the center of the annular die to cause the multi-layered extruded melt to expand into a bubble,
pulling the bubble continuously from the annular die;
dispensing at least one active agent in the interior of the bubble using an atomizer;
collapsing the bubble by pulling the bubble between a pair of nip rollers, wherein the bubble self-adheres to form a film; and
ablating one side of the film using a laser,
wherein the film comprises two self-adhered transmission layers encapsulating at least one active agent, wherein the at least one active agent is distributed at the interface between the two self-adhered transmission layers,
wherein one of the two self-adhered transmission layers is an interior transmission layer and the other is an exterior transmission layer, and
wherein the film further comprises:
an interior barrier layer adjacent to the interior transmission layer;
an interior sealant layer adjacent to the interior barrier layer;
an exterior barrier layer adjacent to the exterior transmission layer;
an exterior sealant layer adjacent to the exterior barrier layer, and
wherein the interior transmission layer, the interior barrier layer, and the interior sealant layer are ablated.

31. The method of embodiment 29 or 30, further comprising:
a) blending a transmission polymer with at least one additive to form first resin pellets; feeding the first resin pellets into a first extruder; and melting the resin pellets to provide the molten transmission polymer;
b) blending a barrier polymer with at least one additive to form second resin pellets; feeding the second resin pellets into a second extruder; and melting the second resin pellets to provide the molten barrier polymer; and
c) blending a sealant polymer with at least one additive to form third resin pellets; feeding the third resin pellets into a third extruder;
melting the third resin pellets to provide the molten sealant polymer.

32. A method for manufacturing a film, comprising:
combining a molten transmission polymer, a first molten tie polymer, a molten barrier polymer, a second molten tie polymer, and a molten sealant polymer in a feedblock;
co-extruding the molten transmission polymer, the first molten tie polymer, the molten barrier polymer, the second molten tie polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt,
the molten barrier polymer is extruded as a barrier layer in between the transmission layer and the sealant layer of the multi-layered extruded melt,
the first molten tie polymer is extruded as a first tie layer in between the transmission layer and the barrier layer, and
the second molten tie polymer is extruded as a second time layer in between the barrier layer and the sealant layer;
injecting an inert gas through a hole in the center of the annular die to cause the multi-layered extruded melt to expand into a bubble,
pulling the bubble continuously from the annular die;
dispensing at least one active agent in the interior of the bubble using an atomizer;
ablating one side of the interior of the bubble using a laser; and
collapsing the ablated bubble by pulling the bubble between a pair of nip rollers, wherein the bubble self-adheres to form a film,
wherein the film comprises two self-adhered transmission layers encapsulating at least one active agent, wherein the at least one active agent is distributed at the interface between the two self-adhered transmission layers,
wherein one of the two self-adhered transmission layers is an interior transmission layer and the other is an exterior transmission layer, and
wherein the film further comprises:
a first interior tie layer adjacent to the interior transmission layer;
an interior barrier layer adjacent to the first interior tie layer;
a second interior tie layer adjacent to the interior barrier layer;
an interior sealant layer adjacent to the second interior tie layer;
a first exterior tie layer adjacent to the exterior transmission layer;
an exterior barrier layer adjacent to the first exterior tie layer;
a second exterior tie layer adjacent to the exterior barrier layer;

an exterior sealant layer adjacent to the second exterior tie layer;
wherein the interior transmission layer, the first interior tie layer, the interior barrier layer, the second interior tie layer, and the interior sealant layer are ablated.

33. A method for manufacturing a film, comprising:
combining a molten transmission polymer, a first molten tie polymer, a molten barrier polymer, a second molten tie polymer, and a molten sealant polymer in a feedblock;
co-extruding the molten transmission polymer, the first molten tie polymer, the molten barrier polymer, the second molten tie polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt,
the molten barrier polymer is extruded as a barrier layer in between the transmission layer and the sealant layer of the multi-layered extruded melt,
the first molten tie polymer is extruded as a first tie layer in between the transmission layer and the barrier layer, and
the second molten tie polymer is extruded as a second time layer in between the barrier layer and the sealant layer;
injecting an inert gas through a hole in the center of the annular die to cause the multi-layered extruded melt to expand into a bubble,
pulling the bubble continuously from the annular die;
dispensing at least one active agent in the interior of the bubble using an atomizer;
collapsing the bubble by pulling the bubble between a pair of nip rollers, wherein the bubble self-adheres to form a film; and
ablating one side of the film using a laser,
wherein the film comprises two self-adhered transmission layers encapsulating at least one active agent, wherein the at least one active agent is distributed at the interface between the two self-adhered transmission layers,
wherein one of the two self-adhered transmission layers is an interior transmission layer and the other is an exterior transmission layer, and
wherein the film further comprises:
a first interior tie layer adjacent to the interior transmission layer;
an interior barrier layer adjacent to the first interior tie layer;
a second interior tie layer adjacent to the interior barrier layer;
an interior sealant layer adjacent to the second interior tie layer;
a first exterior tie layer adjacent to the exterior transmission layer;
an exterior barrier layer adjacent to the first exterior tie layer;
a second exterior tie layer adjacent to the exterior barrier layer;
an exterior sealant layer adjacent to the second exterior tie layer;
wherein the interior transmission layer, the first interior tie layer, the interior barrier layer, the second interior tie layer, and the interior sealant layer are ablated.

34. The method of embodiment 32 or 33, further comprising:

a) blending a transmission polymer with at least one additive to form first resin pellets; feeding the first resin pellets into a first extruder; and melting the resin pellets to provide the molten transmission polymer;

b) blending a barrier polymer with at least one additive to form second resin pellets; feeding the second resin pellets into a second extruder; and melting the second resin pellets to form the molten barrier polymer;

c) blending a sealant polymer with at least one additive to form third resin pellets; feeding the third resin pellets into a third extruder; and melting the third resin pellets to form the molten sealant polymer;

d) blending a first tie polymer with at least one additive to form fourth resin pellets; feeding the fourth resin pellets into a fourth extruder; and melting the fourth resin pellets to form the first molten tie polymer; and e) blending a second tie polymer with at least one additive to form fifth resin pellets; feeding the fifth resin pellets into a fifth extruder; and melting the fifth resin pellets to form the second molten tie polymer.

35. A method for manufacturing a film, comprising:

combining a molten transmission polymer, a molten tie polymer, and an additional molten transmission polymer having a lower transmission rate;

co-extruding the molten transmission polymer, the molten tie polymer, and the additional molten transmission polymer from the feedblock through an annular die to form a multi-layered extruded melt, wherein:

the molten transmission polymer is extruded as a transmission layer, and the molten tie polymer and the additional molten transmission polymer having the lower transmission rate are extruded on one side of the annular die as a tie layer and an additional transmission layer;

injecting an inert gas through a hole in the center of the annular die to cause the multi-layered extruded melt to expand into a bubble, pulling the bubble continuously from the annular die;

dispensing at least one active agent in the interior of the bubble using an atomizer;

collapsing the bubble by pulling the bubble between a pair of nip rollers, wherein the bubble self-adheres to form a film, wherein the film comprises two self-adhered transmission layers encapsulating at least one active agent, wherein the at least one active agent is distributed at the interface between the two self-adhered transmission layers, wherein one of the two self-adhered transmission layers is an interior transmission layer and the other is an exterior transmission layer, and wherein the additional transmission layer having the lower transmission rate is adjacent to the exterior transmission layer.

36. The method of embodiment 35, further comprising:

a) blending a transmission polymer with at least one additive to form first resin pellets; feeding the first resin pellets into a first extruder; and melting the resin pellets to provide the molten transmission polymer; and
b) blending an additional transmission polymer having a lower transmission rate with at least one additive to form second resin pellets;
feeding the second resin pellets into a second extruder; and
melting the second resin pellets to provide the additional molten transmission polymer.

37. The method of embodiment 27 or 28, wherein one of the two self-adhered transmission layers is an interior transmission layer and the other is an exterior transmission layer, the method further comprising:
depositing a lower transmission coating on the exterior transmission layer.

38. The method of embodiment 37, wherein the lower transmission coating is an organic coating.

39. The method of embodiment 38, wherein the organic coating comprises polyvinylidene chloride (PVDC), polyvinyl alcohol (PVOH), or nanoclay, or any combinations thereof.

40. The method of embodiment 39, wherein the lower transmission coating is an inorganic coating.

41. The method of embodiment 38, wherein the inorganic coating comprises aluminum, aluminum oxide or silicon oxide.

42. The method of any one of embodiments 37 to 41, wherein the lower transmission coating is deposited by vapor deposition.

43. A method for manufacturing a film, comprising:
combining a molten transmission polymer and an additional molten transmission polymer having a lower melt point;
co-extruding the molten transmission polymer and the additional molten transmission polymer from the feedblock through an annular die to form a multi-layered extruded melt, wherein:
the molten transmission polymer is extruded as an outer transmission sublayer, and
the additional molten transmission polymer having the lower melt point is extruded as an inner transmission sublayer;
injecting an inert gas through a hole in the center of the annular die to cause the multi-layered extruded melt to expand into a bubble,
pulling the bubble continuously from the annular die;
dispensing at least one active agent in the interior of the bubble using an atomizer;
collapsing the bubble by pulling the bubble between a pair of nip rollers, wherein the bubble self-adheres to form a film,
wherein the film comprises two self-adhered transmission layers, each comprising an inner transmission sublayer and an outer transmission sublayer,
wherein the inner transmission sublayers have a lower melt point than the outer transmission sublayers, and
wherein the inner transmission sublayers form the interface of the two self-adhered transmission layers and encapsulate the at least one active agent.

44. The method of any one of embodiments 27 to 43, further comprising:
cooling the film; and
winding the cooled film onto a roll.

45. The method of any one of embodiments 27 to 44, wherein the inert gas is nitrogen, carbon dioxide, or helium, or any combinations thereof.

46. The method of any one of embodiments 27 to 45, wherein the bubble self-adheres by:
(i) applying pressure at the haul-off nip sufficient to entangle the polymeric chains on the inner surface of the bubble; or
(ii) maintaining the inner temperature of the bubble above the Vicat Softening Point of the transmission layer and below the boiling point of the active ingredient; or
(iii) increasing the nip speed,
or any combinations of (i)-(iii).

47. The method of any one of embodiments 27 to 46, wherein the ablation by laser is laser scoring, laser cutting or laser micro-perforation.

48. The method of any one of embodiments 27 to 47, wherein the additives comprise at least one amide compounds.

49. The method of any one of embodiments 27 to 48, wherein the additives comprise an oleamide fatty acid, an erucamide fatty acid, or any combinations thereof.

50. The method of any one of embodiments 27 to 49, wherein the additives provide a coefficient of friction in the range of 0.05-0.8.

51. The method of any one of embodiments 27 to 50, wherein the additives are blended at a concentration of 200-1000 parts per million (ppm) in the extruded melt.

52. A film produced according to the method of any one of embodiments 27 to 51.

EXAMPLES

Example 1: Dowlex™ 2740G Polyethylene Blown Film

This example describes the manufacture of a blown film made from the Dowlex™ 2740G Polyethylene.

The Dowlex™ 2740G Polyethylene resin is conveyed to the input of a 55 mm blown film extruder of 25:1 length to diameter ratio and a 150 mm annular die. The extruder temperature zone is set to 195° C. while the temperatures of the adapter and the annular die are set to 215° C. The extruder is set to rotate at 100 RPM. The blow-up ratio is set to 3:1 to arrive to a 450 mm diameter film bubble. The haul-off speed is set to 40 meters per minute. This results in a collapsed film bubble with 50 micron thickness. There is an external air ring and no internal bubble cooling apparatus (IBC). In the place of the IBC, a liquid dispersion device (LDD) is positioned that atomizes the active ingredient (ethyl pyruvate) within the interior of the film bubble. The interior of the film bubble is slowly filled with nitrogen gas ($N_2$) at a low rate of 100 liters per minute at slightly above atmospheric pressure until the desired film bubble diameter of 450 mm is achieved. The LDD is activated to release 40 grams per minute of ethyl pyruvate into the interior of the film bubble. The resulting film is collected and tested for shelf adhesion by using ASTM F88-15 seal strength methodology.

What is claimed is:
1. A film comprising:
two self-adhered transmission layers encapsulating at least one active agent, wherein the at least one active agent is distributed at the interface between the two self-adhered transmission layers,
wherein one of the two self-adhered transmission layers is an interior transmission layer and the other is an exterior transmission layer, and wherein the film further comprises:

an interior barrier layer adjacent to the interior transmission layer,
an interior sealant layer adjacent to the interior barrier layer,
an exterior barrier layer adjacent to the exterior transmission layer; and
an exterior sealant layer adjacent to the exterior barrier layer,
wherein at least the interior transmission layer and the interior barrier layer are ablated.

2. The film of claim 1, wherein the at least one active agent comprises ethyl pyruvate, 3-methyl-1-butanol acetate, diallyl thiosulfinate, cinnamaldehyde, citral, thymol, menthol, eugenol, or carvacrol, or any combination thereof.

3. The film of claim 1, wherein:
(i) each transmission layer comprises an unbranched or short-branched polyethylene, or each transmission layer comprises linear low-density polyethylene (LLDPE); or
(ii) the barrier layer comprises polyvinyl alcohol (PVOH) or polyvinylidene chloride (PVDC); or
(iii) the sealant layer comprises low density polyethylene (LDPE) or linear low-density polyethylene (LLDPE),
or any combinations of (i)-(iii).

4. A method for manufacturing the film of claim 1, comprising:
combining a molten transmission polymer, a molten barrier polymer, and a molten sealant polymer in a feedblock;
co-extruding the molten transmission polymer, the molten barrier polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt, and
the molten barrier polymer is extruded as a barrier layer in between the transmission layer and the sealant layer of the multi-layered extruded melt;
injecting an inert gas through a hole in the center of the annular die to cause the multi-layered extruded melt to expand into a bubble,
pulling the bubble continuously from the annular die;
dispensing at least one active agent in the interior of the bubble using an atomizer,
ablating one side of the interior of the bubble using a laser, and
collapsing the ablated bubble by pulling the bubble between a pair of nip rollers, wherein the bubble self-adheres to form the film.

5. The method of claim 4, further comprising:
a) blending a transmission polymer with at least one additive to form first resin pellets;
feeding the first resin pellets into a first extruder; and
melting the resin pellets to provide the molten transmission polymer,
b) blending a barrier polymer with at least one additive to form second resin pellets;
feeding the second resin pellets into a second extruder; and
melting the second resin pellets to provide the molten barrier polymer, and
c) blending a sealant polymer with at least one additive to form third resin pellets;
feeding the third resin pellets into a third extruder;
melting the third resin pellets to provide the molten sealant polymer.

6. The method of claim 5, wherein:
(i) the additives comprise at least one amide compounds; or
(ii) the additives comprise an oleamide fatty acid, an erucamide fatty acid, or any combinations thereof; or
(iii) the additives provide a coefficient of friction in the range of 0.05-0.8; or
(iv) the additives are blended at a concentration of 200-1000 parts per million (ppm) in the extruded melt,
or any combinations of (i)-(iv).

7. The method of claim 4, further comprising:
cooling the film; and
winding the cooled film onto a roll.

8. The method of claim 4, wherein the bubble self-adheres by:
(i) applying pressure at the haul-off nip sufficient to entangle the polymeric chains on the inner surface of the bubble; or
(ii) maintaining the inner temperature of the bubble above the Vicat Softening Point of the transmission layer and below the boiling point of the active ingredient; or
(iii) increasing the nip speed,
or any combinations of (i)-(iii).

9. A method for manufacturing the film of claim 1, comprising:
combining a molten transmission polymer, a molten barrier polymer, and a molten sealant polymer in a feedblock;
co-extruding the molten transmission polymer, the molten barrier polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt, and
the molten barrier polymer is extruded as a barrier layer in between the transmission layer and the sealant layer of the multi-layered extruded melt;
injecting an inert gas through a hole in the center of the annular die to cause the multi-layered extruded melt to expand into a bubble,
pulling the bubble continuously from the annular die;
dispensing at least one active agent in the interior of the bubble using an atomizer,
collapsing the bubble by pulling the bubble between a pair of nip rollers, wherein the bubble self-adheres to form a film; and
ablating one side of the film using a laser to form the film.

10. The method of claim 9, further comprising:
cooling the film; and
winding the cooled film onto a roll.

11. The method of claim 9, wherein the bubble self-adheres by:
(i) applying pressure at the haul-off nip sufficient to entangle the polymeric chains on the inner surface of the bubble; or
(ii) maintaining the inner temperature of the bubble above the Vicat Softening Point of the transmission layer and below the boiling point of the active ingredient; or
(iii) increasing the nip speed,
or any combinations of (i)-(iii).

12. The method of claim 9, further comprising:
a) blending a transmission polymer with at least one additive to form first resin pellets;
feeding the first resin pellets into a first extruder, and melting the resin pellets to provide the molten transmission polymer,
b) blending a barrier polymer with at least one additive to form second resin pellets;
feeding the second resin pellets into a second extruder, and
melting the second resin pellets to provide the molten barrier polymer, and
c) blending a sealant polymer with at least one additive to form third resin pellets;
feeding the third resin pellets into a third extruder;
melting the third resin pellets to provide the molten sealant polymer.

13. The method of claim 12, wherein:
(i) the additives comprise at least one amide compounds; or
(ii) the additives comprise an oleamide fatty acid, an erucamide fatty acid, or any combinations thereof; or
(iii) the additives provide a coefficient of friction in the range of 0.05-0.8; or
(iv) the additives are blended at a concentration of 200-1000 parts per million (ppm) in the extruded melt,
or any combinations of (i)-(iv).

14. A film comprising:
two self-adhered transmission layers encapsulating at least one active agent, wherein the at least one active agent is distributed at the interface between the two self-adhered transmission layers,
wherein one of the two self-adhered transmission layers is an interior transmission layer and the other is an exterior transmission layer, and wherein the film further comprises:
a first interior tie layer adjacent to the interior transmission layer,
an interior barrier layer adjacent to the first interior tie layer;
a second interior tie layer adjacent to the interior barrier layer;
an interior sealant layer adjacent to the second interior tie layer;
a first exterior tie layer adjacent to the exterior transmission layer;
an exterior barrier layer adjacent to the first exterior tie layer,
a second exterior tie layer adjacent to the exterior barrier layer; and
an exterior sealant layer adjacent to the second exterior tie layer,
wherein at least the interior transmission layer, the first interior tie layer and the interior barrier layer are ablated.

15. A method for manufacturing the film of claim 14, comprising:
combining a molten transmission polymer, a first molten tie polymer, a molten barrier polymer, a second molten tie polymer, an a molten sealant polymer in a feedblock;
co-extruding the molten transmission polymer, the first molten tie polymer, the molten barrier polymer, the second molten tie polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt,
the molten barrier polymer is extruded as a barrier layer in between the transmission layer and the sealant layer of the multi-layered extruded melt,
the first molten tie polymer is extruded as a first tie layer in between the transmission layer and the barrier layer, and
the second molten tie polymer is extruded as a second time layer in between the barrier layer and the sealant layer;
injecting an inert gas through a hole in the center of the annular die to cause the multi-layered extruded melt to expand into a bubble,
pulling the bubble continuously from the annular die;
dispensing at least one active agent in the interior of the bubble using an atomizer,
ablating one side of the interior of the bubble using a laser, and
collapsing the ablated bubble by pulling the bubble between a pair of nip rollers, wherein the bubble self-adheres to form the film.

16. The method of claim 15, further comprising:
a) blending a transmission polymer with at least one additive to form first resin pellets;
feeding the first resin pellets into a first extruder; and
melting the resin pellets to provide the molten transmission polymer;
b) blending a barrier polymer with at least one additive to form second resin pellets;
feeding the second resin pellets into a second extruder; and
melting the second resin pellets to form the molten barrier polymer;
c) blending a sealant polymer with at least one additive to form third resin pellets;
feeding the third resin pellets into a third extruder; and
melting the third resin pellets to form the molten sealant polymer;
d) blending a first tie polymer with at least one additive to form fourth resin pellets;
feeding the fourth resin pellets into a fourth extruder, and
melting the fourth resin pellets to form the first molten tie polymer, and
e) blending a second tie polymer with at least one additive to form fifth resin pellets;
feeding the fifth resin pellets into a fifth extruder, and
melting the fifth resin pellets to form the second molten tie polymer.

17. The method of claim 16, wherein:
(i) the additives comprise at least one amide compounds; or
(ii) the additives comprise an oleamide fatty acid, an erucamide fatty acid, or any combinations thereof; or
(iii) the additives provide a coefficient of friction in the range of 0.05-0.8; or
(iv) the additives are blended at a concentration of 200-1000 parts per million (ppm) in the extruded melt,
or any combinations of (i)-(iv).

18. The method of claim 15, further comprising:
cooling the film; and
winding the cooled film onto a roll.

19. The method of claim 15, wherein the bubble self-adheres by:
(i) applying pressure at the haul-off nip sufficient to entangle the polymeric chains on the inner surface of the bubble; or
(ii) maintaining the inner temperature of the bubble above the Vicat Softening Point of the transmission layer and below the boiling point of the active ingredient; or
(iii) increasing the nip speed,
or any combinations of (i)-(iii).

20. A method for manufacturing the film of claim 14, comprising:
combining a molten transmission polymer, a first molten tie polymer, a molten barrier polymer, a second molten tie polymer, and a molten sealant polymer in a feedblock;
co-extruding the molten transmission polymer, the first molten tie polymer, the molten barrier polymer, the second molten tie polymer, and the molten sealant polymer from the feedblock through an annular die to form a multi-layered extruded melt, wherein:
the molten transmission polymer is extruded as a transmission layer on the inside of the multi-layered extruded melt,
the molten sealant polymer is extruded as a sealant layer on the outside of the multi-layered extruded melt,
the molten barrier polymer is extruded as a barrier layer in between the transmission layer and the sealant layer of the multi-layered extruded melt,
the first molten tie polymer is extruded as a first tie layer in between the transmission layer and the barrier layer, and
the second molten tie polymer is extruded as a second time layer in between the barrier layer and the sealant layer;
injecting an inert gas through a hole in the center of the annular die to cause the multi-layered extruded melt to expand into a bubble,
pulling the bubble continuously from the annular die;
dispensing at least one active agent in the interior of the bubble using an atomizer,
collapsing the bubble by pulling the bubble between a pair of nip rollers, wherein the bubble self-adheres to form a film; and
ablating one side of the film using a laser to form the film.

21. The method of claim 20, further comprising:
cooling the film; and
winding the cooled film onto a roll.

22. The method of claim 20, wherein the bubble self-adheres by:
(i) applying pressure at the haul-off nip sufficient to entangle the polymeric chains on the inner surface of the bubble; or
(ii) maintaining the inner temperature of the bubble above the Vicat Softening Point of the transmission layer and below the boiling point of the active ingredient; or
(iii) increasing the nip speed,
or any combinations of (i)-(iii).

23. The method of claim 20, further comprising:
a) blending a transmission polymer with at least one additive to form first resin pellets;
feeding the first resin pellets into a first extruder; and melting the resin pellets to provide the molten transmission polymer,
b) blending a barrier polymer with at least one additive to form second resin pellets;
feeding the second resin pellets into a second extruder, and
melting the second resin pellets to form the molten barrier polymer;
c) blending a sealant polymer with at least one additive to form third resin pellets;
feeding the third resin pellets into a third extruder, and melting the third resin pellets to form the molten sealant polymer;
d) blending a first tie polymer with at least one additive to form fourth resin pellets;
feeding the fourth resin pellets into a fourth extruder, and
melting the fourth resin pellets to form the first molten tie polymer, and
e) blending a second tie polymer with at least one additive to form fifth resin pellets;
feeding the fifth resin pellets into a fifth extruder; and melting the fifth resin pellets to form the second molten tie polymer.

24. The method of claim 23, wherein:
(i) the additives comprise at least one amide compounds; or
(ii) the additives comprise an oleamide fatty acid, an erucamide fatty acid, or any combinations thereof; or
(iii) the additives provide a coefficient of friction in the range of 0.05-0.8; or
(iv) the additives are blended at a concentration of 200-1000 parts per million (ppm) in the extruded melt,
or any combinations of (i)-(iv).

25. The film of claim 14, wherein the at least one active agent comprises ethyl pyruvate, 3-methyl-1-butanol acetate, diallyl thiosulfinate, cinnamaldehyde, citral, thymol, menthol, eugenol, or carvacrol, or any combination thereof.

26. The film of claim 14, wherein:
(i) each transmission layer comprises an unbranched or short-branched polyethylene, or each transmission layer comprises linear low-density polyethylene (LLDPE); or
(ii) the tie layer comprises ethylene-grafted-maleic anhydride or anhydride modified polyethylene; or
(iii) the barrier layer comprises polyvinyl alcohol (PVOH) or polyvinylidene chloride (PVDC); or
(iv) the sealant layer comprises low density polyethylene (LDPE) or linear low-density polyethylene (LLDPE),
or any combinations of (i)-(iv).

27. A film comprising:
two self-adhered transmission layers encapsulating at least one active agent, wherein the at least one active agent is distributed at the interface between the two self-adhered transmission layers,
wherein each of two self-adhered transmission layers comprises an inner transmission sublayer and an outer transmission sublayer,
wherein the inner transmission sublayers have a lower melt point than the outer transmission sublayers, and
wherein the inner transmission sublayers self-adhere to form the interface of the two self-adhered transmission layers and encapsulate the at least one active agent.

28. A method for manufacturing the film of claim 27, comprising:
combining a molten transmission polymer and an additional molten transmission polymer having a lower melt point;

co-extruding the molten transmission polymer and the additional molten transmission polymer from the feedblock through an annular die to form a multi-layered extruded melt, wherein:
  the molten transmission polymer is extruded as an outer transmission sublayer, and
  the additional molten transmission polymer having the lower melt point is extruded as an inner transmission sublayer,
injecting an inert gas through a hole in the center of the annular die to cause the multi-layered extruded melt to expand into a bubble,
pulling the bubble continuously from the annular die;
dispensing at least one active agent in the interior of the bubble using an atomizer,
collapsing the bubble by pulling the bubble between a pair of nip rollers, wherein the bubble self-adheres to form the film.

29. The method of claim 28, further comprising:
cooling the film; and
winding the cooled film onto a roll.

30. The method of claim 28, wherein the bubble self-adheres by:
  (i) applying pressure at the haul-off nip sufficient to entangle the polymeric chains on the inner surface of the bubble; or
  (ii) maintaining the inner temperature of the bubble above the Vicat Softening Point of the transmission layer and below the boiling point of the active ingredient; or
  (iii) increasing the nip speed,
or any combinations of (i)-(iii).

31. The film of claim 27, wherein the at least one active agent comprises ethyl pyruvate, 3-methyl-1-butanol acetate, diallyl thiosulfinate, cinnamaldehyde, citral, thymol, menthol, eugenol, or carvacrol, or any combination thereof.

32. The film of claim 27, wherein each transmission layer comprises an unbranched or short-branched polyethylene, or each transmission layer comprises linear low-density polyethylene (LLDPE).

* * * * *